(12) United States Patent
Lahr

(10) Patent No.: US 6,810,119 B2
(45) Date of Patent: Oct. 26, 2004

(54) EXPANDABLE AND CONTRACTIBLE KEYBOARD WITH ADJUSTABLE KEY SIZES

(75) Inventor: Roy J. Lahr, Los Angeles, CA (US)

(73) Assignee: RAST Associates, LLC, Long Beach, CA (US)

( * ) Notice: Subject to any disclaimer, the term of this patent is extended or adjusted under 35 U.S.C. 154(b) by 353 days.

(21) Appl. No.: 09/775,291

(22) Filed: Feb. 1, 2001

(65) Prior Publication Data

US 2001/0028712 A1 Oct. 11, 2001

Related U.S. Application Data

(63) Continuation-in-part of application No. 09/558,866, filed on Apr. 26, 2000.
(60) Provisional application No. 60/255,295, filed on Dec. 13, 2000, provisional application No. 60/233,965, filed on Sep. 20, 2000, provisional application No. 60/221,114, filed on Jul. 27, 2000, and provisional application No. 60/178,936, filed on Feb. 1, 2000.

(51) Int. Cl.$^7$ .............................................. H04M 1/00
(52) U.S. Cl. ................... 379/368; 379/433.07
(58) Field of Search ........................... 379/368, 433.07, 379/428.01, 428.04, 445; 455/566, 556.2; 700/5 R

(56) References Cited

U.S. PATENT DOCUMENTS

| | | | |
|---|---|---|---|
| 3,940,758 A | 2/1976 | Margolin | |
| 4,396,810 A | * 8/1983 | Cover | ........................ 379/445 |
| 4,597,681 A | 7/1986 | Hodges | |
| 4,661,005 A | 4/1987 | Lahr | |
| 4,677,600 A | 6/1987 | Yoshida | |
| 5,044,798 A | 9/1991 | Roylance et al. | |
| 5,141,343 A | 8/1992 | Roylance et al. | |
| 5,163,765 A | 11/1992 | Levy | |
| 5,187,644 A | 2/1993 | Crisan | |
| 5,212,473 A | 5/1993 | Louis | |
| 5,220,521 A | 6/1993 | Kikinis | |
| 5,337,346 A | * 8/1994 | Uchikura | .................. 455/556.2 |
| 5,457,453 A | 10/1995 | Chiu et al. | |
| 5,459,461 A | 10/1995 | Crowley et al. | |
| 5,519,569 A | 5/1996 | Sellers | |
| 5,575,576 A | 11/1996 | Roysden et al. | |
| 5,590,020 A | 12/1996 | Sellers | |
| 5,590,382 A | 12/1996 | Kikinis et al. | |
| 5,742,241 A | 4/1998 | Crowley et al. | |
| 5,743,666 A | 4/1998 | VanZeeland et al. | |
| 5,870,034 A | 2/1999 | Wood | |
| 5,938,353 A | 8/1999 | Butler | |
| 6,019,530 A | 2/2000 | Lanzetta et al. | |
| 6,036,093 A | 3/2000 | Schultz | |
| 6,056,456 A | 5/2000 | Kinoshita | |
| 6,059,470 A | 5/2000 | Myint | |
| 6,068,417 A | 5/2000 | Butler | |
| 6,087,966 A | 7/2000 | Sato | |
| 6,092,944 A | 7/2000 | Butler | |
| 6,152,627 A | 11/2000 | Watanabe et al. | |
| 6,174,097 B1 | 1/2001 | Daniel | |
| 6,257,782 B1 | 7/2001 | Maruyama et al. | |
| 6,327,482 B1 | * 12/2001 | Miyashita | ................... 455/566 |
| 2001/0003450 A1 | 6/2001 | Hemia et al. | |
| 2001/0012195 A1 | 8/2001 | Lefort | |
| 2001/0028712 A1 | 10/2001 | Lahr | |

* cited by examiner

Primary Examiner—Jack Chiang
(74) Attorney, Agent, or Firm—Kenyon & Kenyon

(57) ABSTRACT

A keyboard which may be utilized in either an expanded or contracted state. The keyboard is comprised of an expandable and compressible housing which supports a plurality of elastic belts. Keyswitch assemblies are fastened to the elastic belt. When the keyboard housing is expanded, the elastic belts are stretched, and the distance between the keys is increased. The keytops can be of variable size so that upon expansion, they increase in size. The keytops can also rotate upon expansion to increase the striking surface of the keytop.

5 Claims, 33 Drawing Sheets

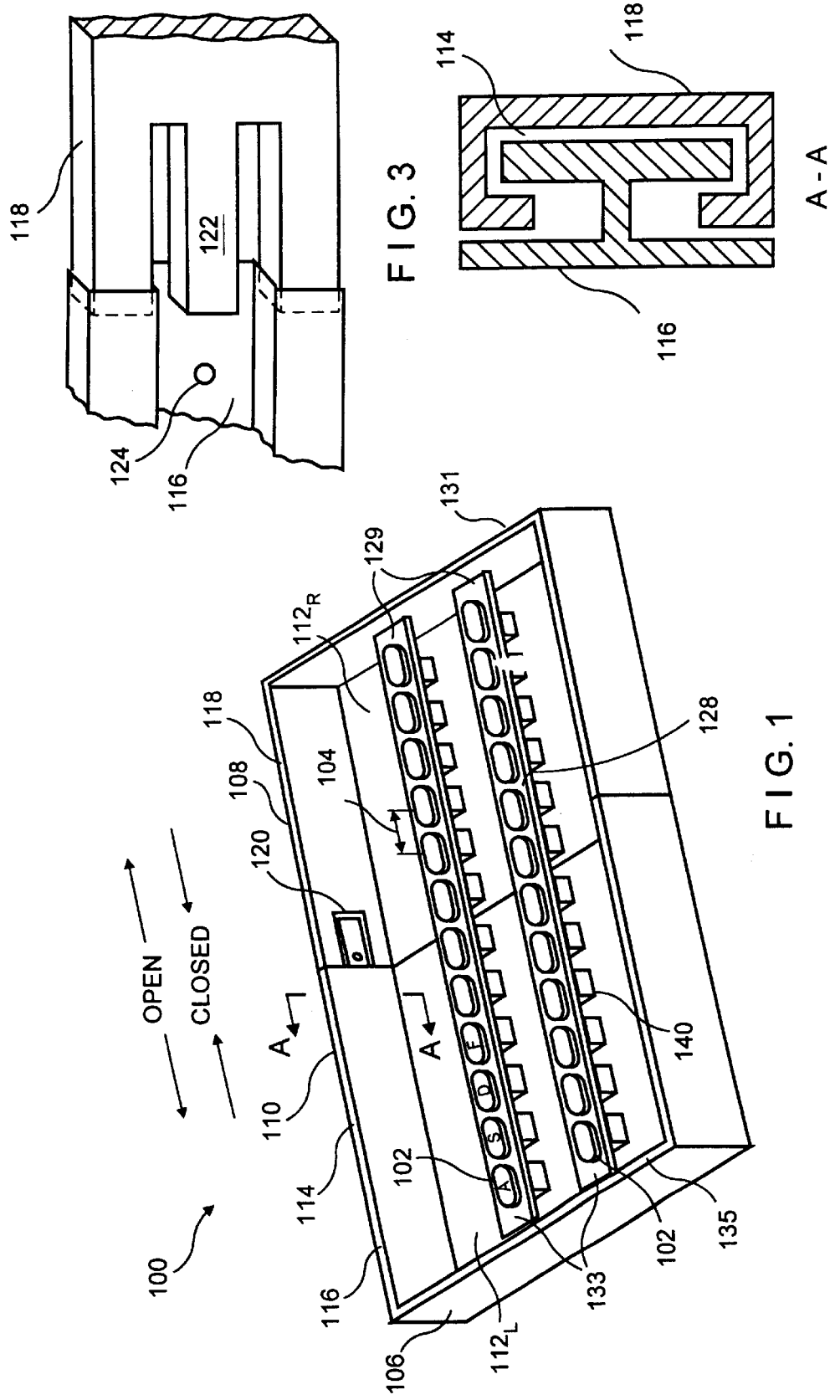

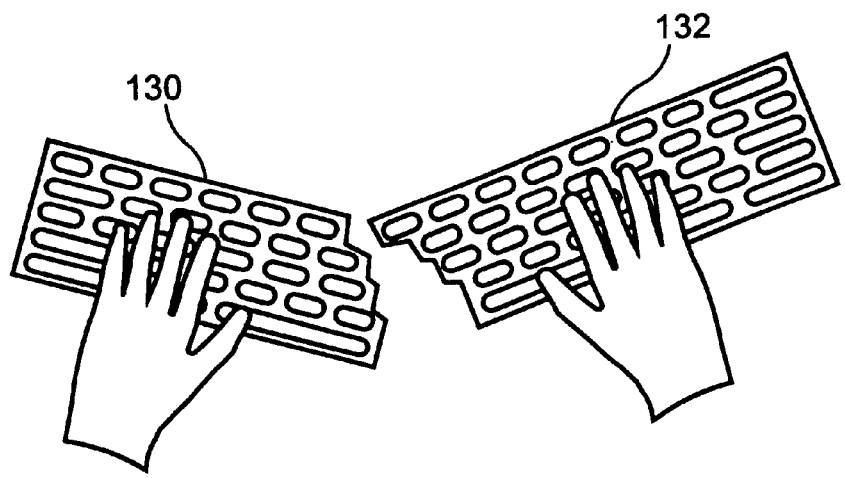
F I G. 4
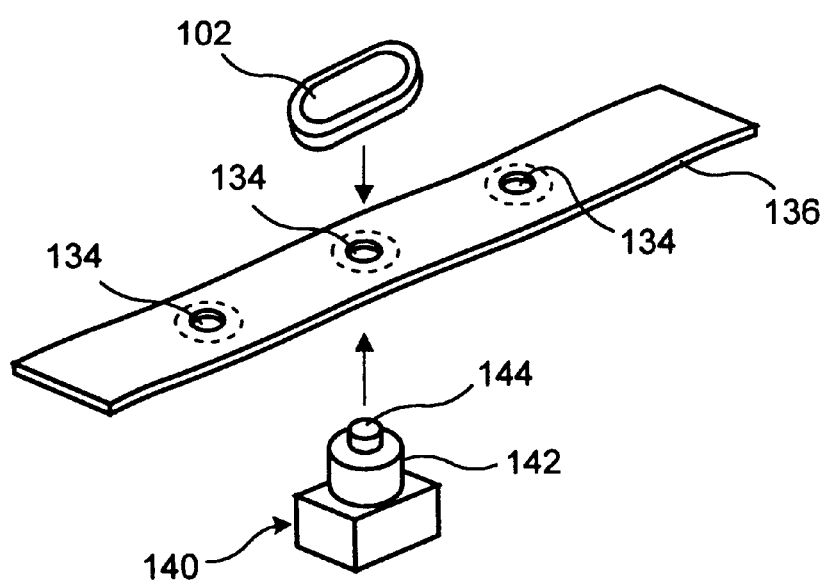
F I G. 5

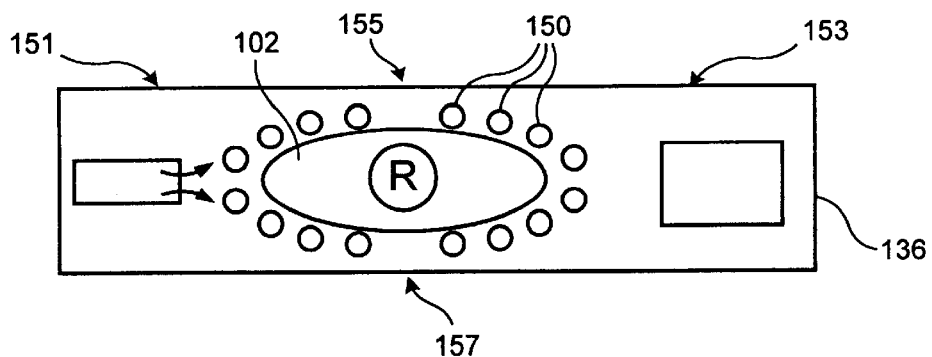
F I G. 8
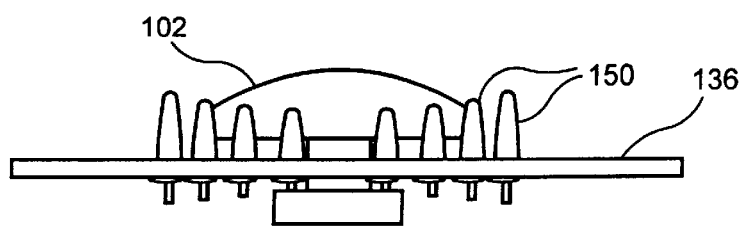
F I G. 9
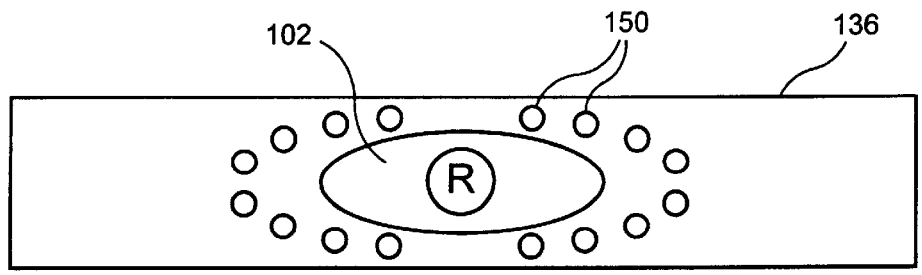
F I G. 10
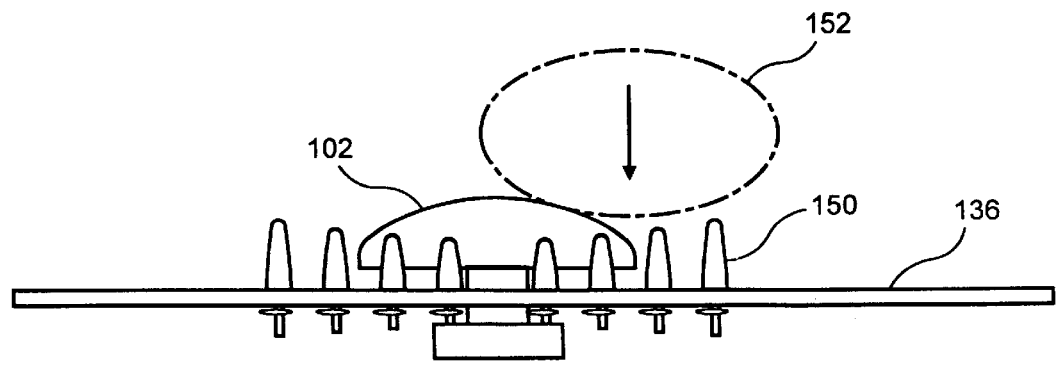
F I G. 11

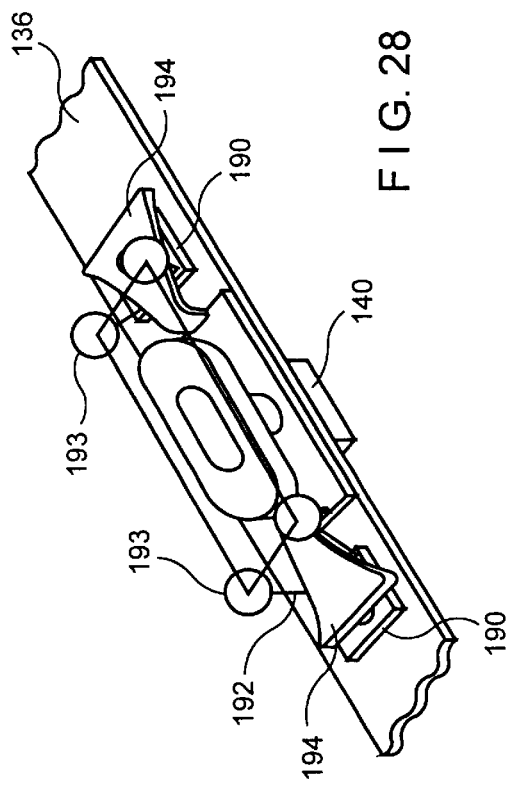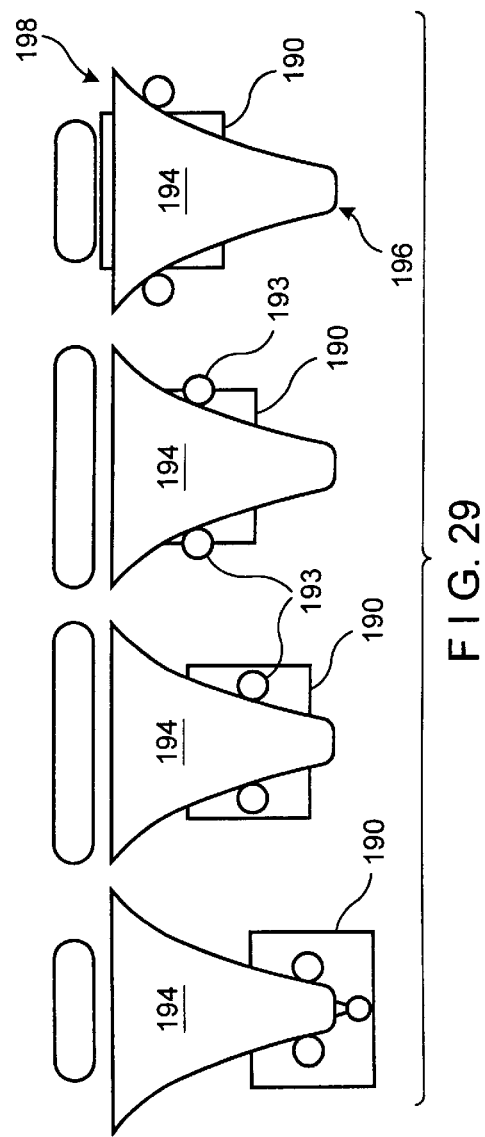

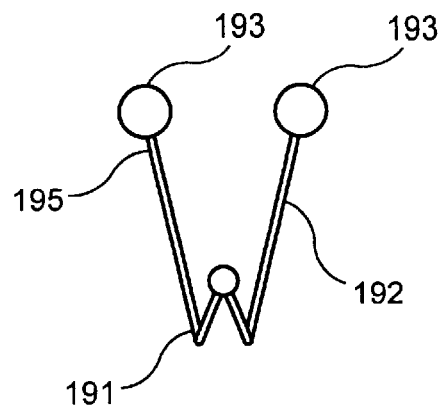
F I G. 30
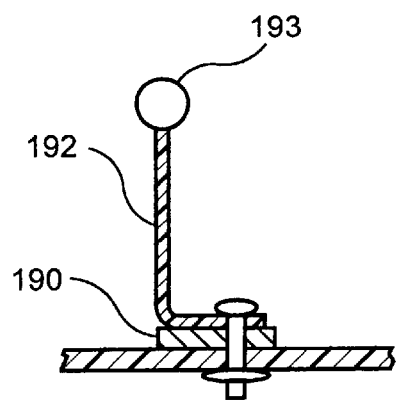
F I G. 31
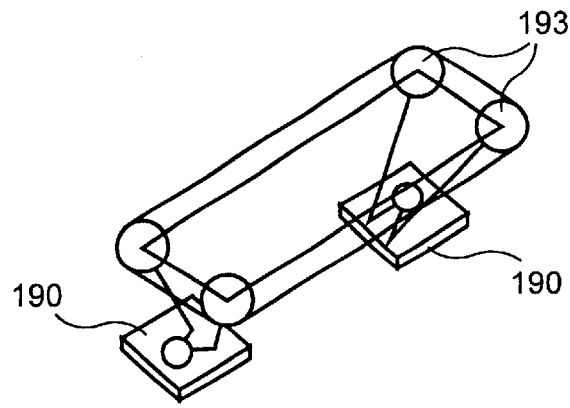
F I G. 32
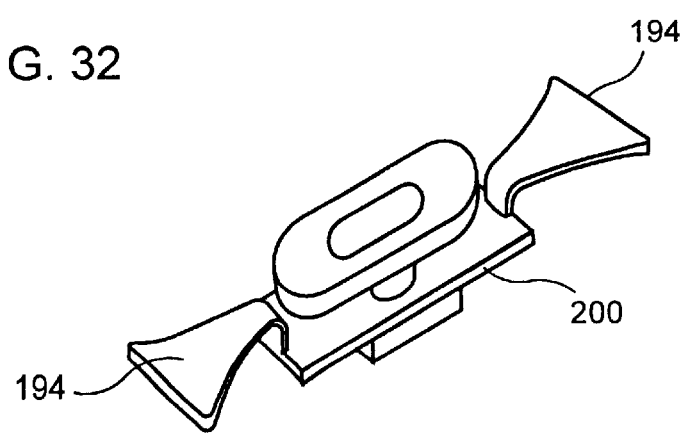
F I G. 33

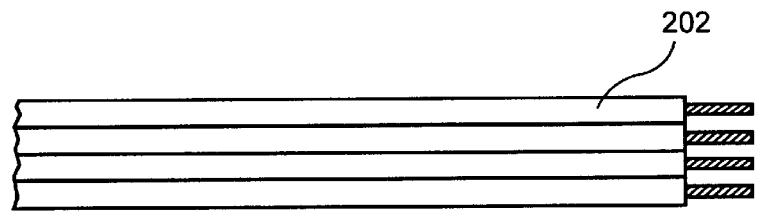
F I G. 34a
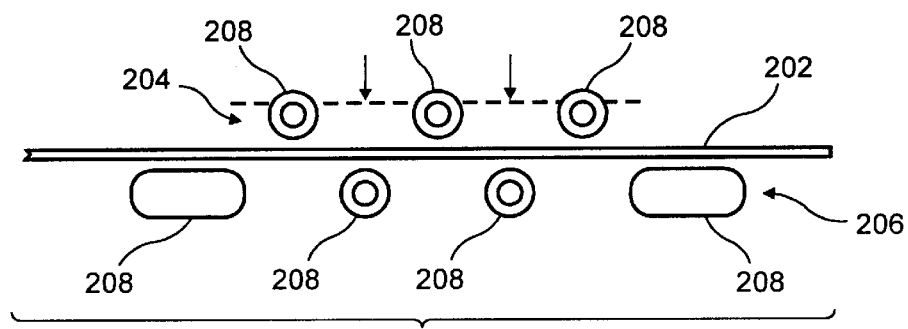
F I G. 34b
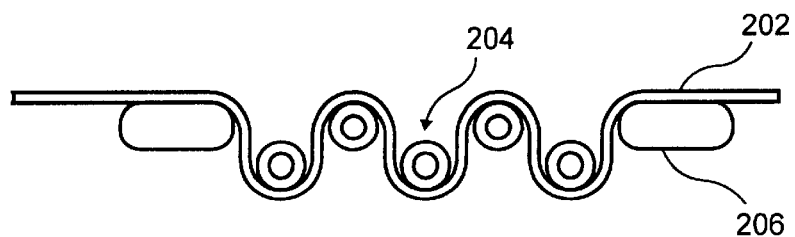
F I G. 34c
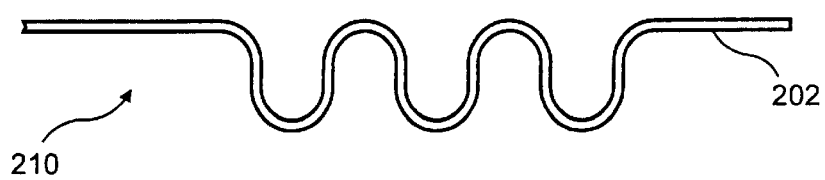
F I G. 34d

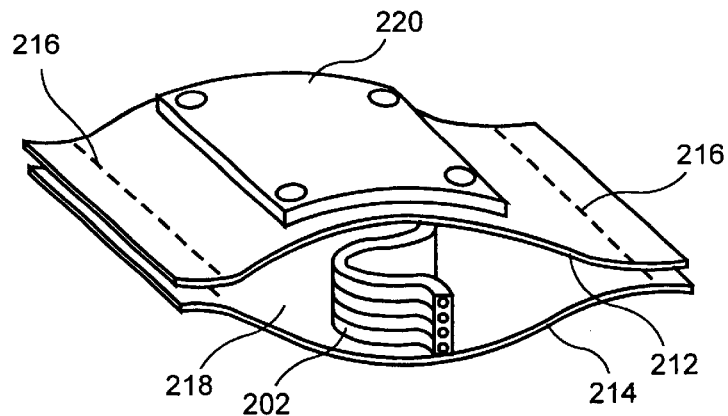
F I G. 35
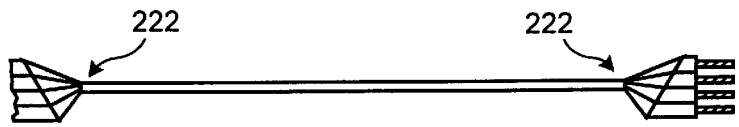
F I G. 36
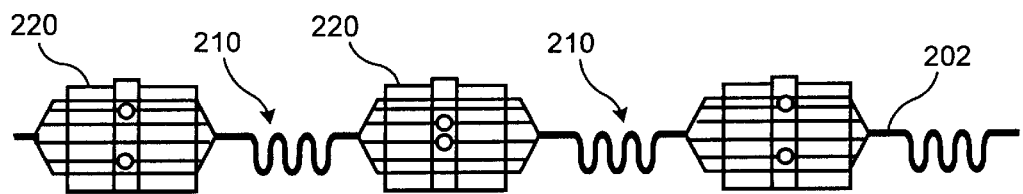
F I G. 37
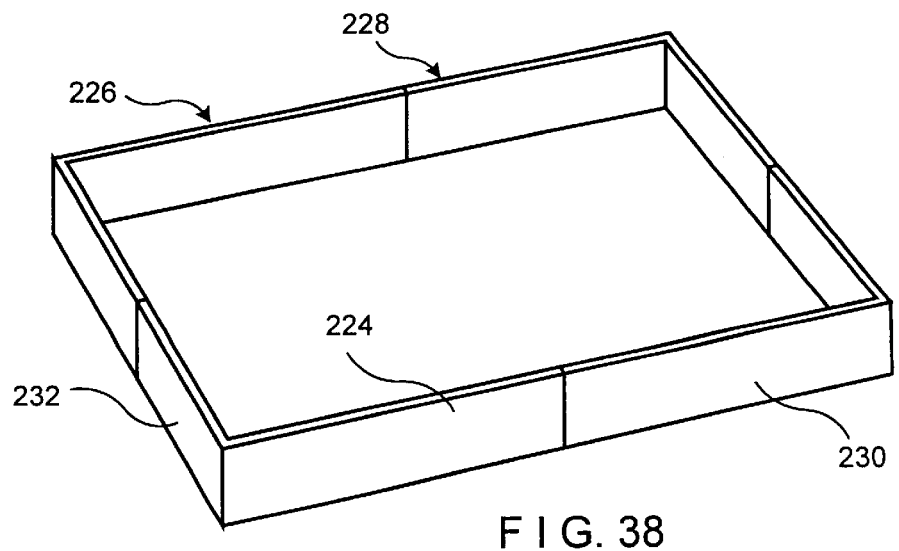
F I G. 38

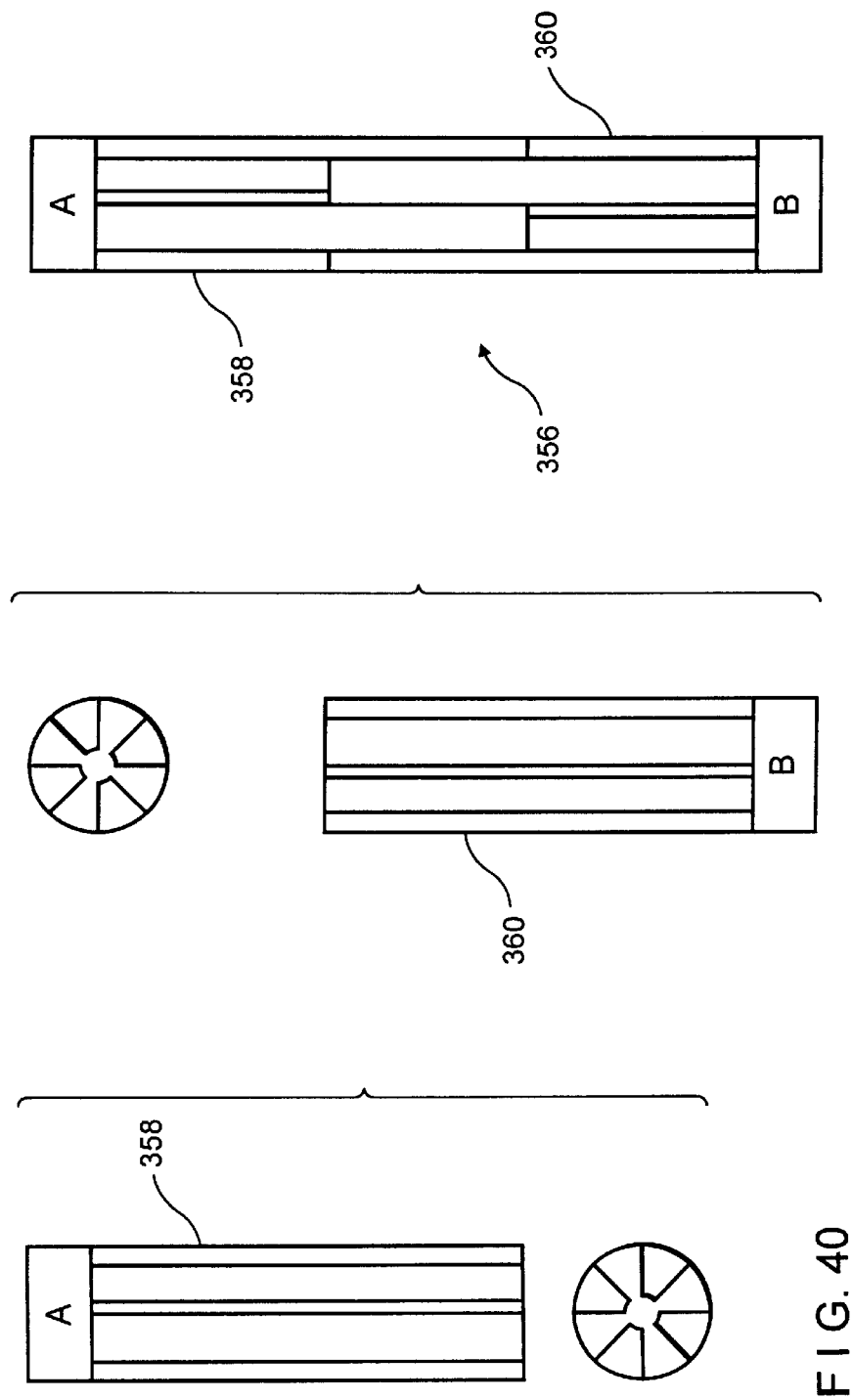

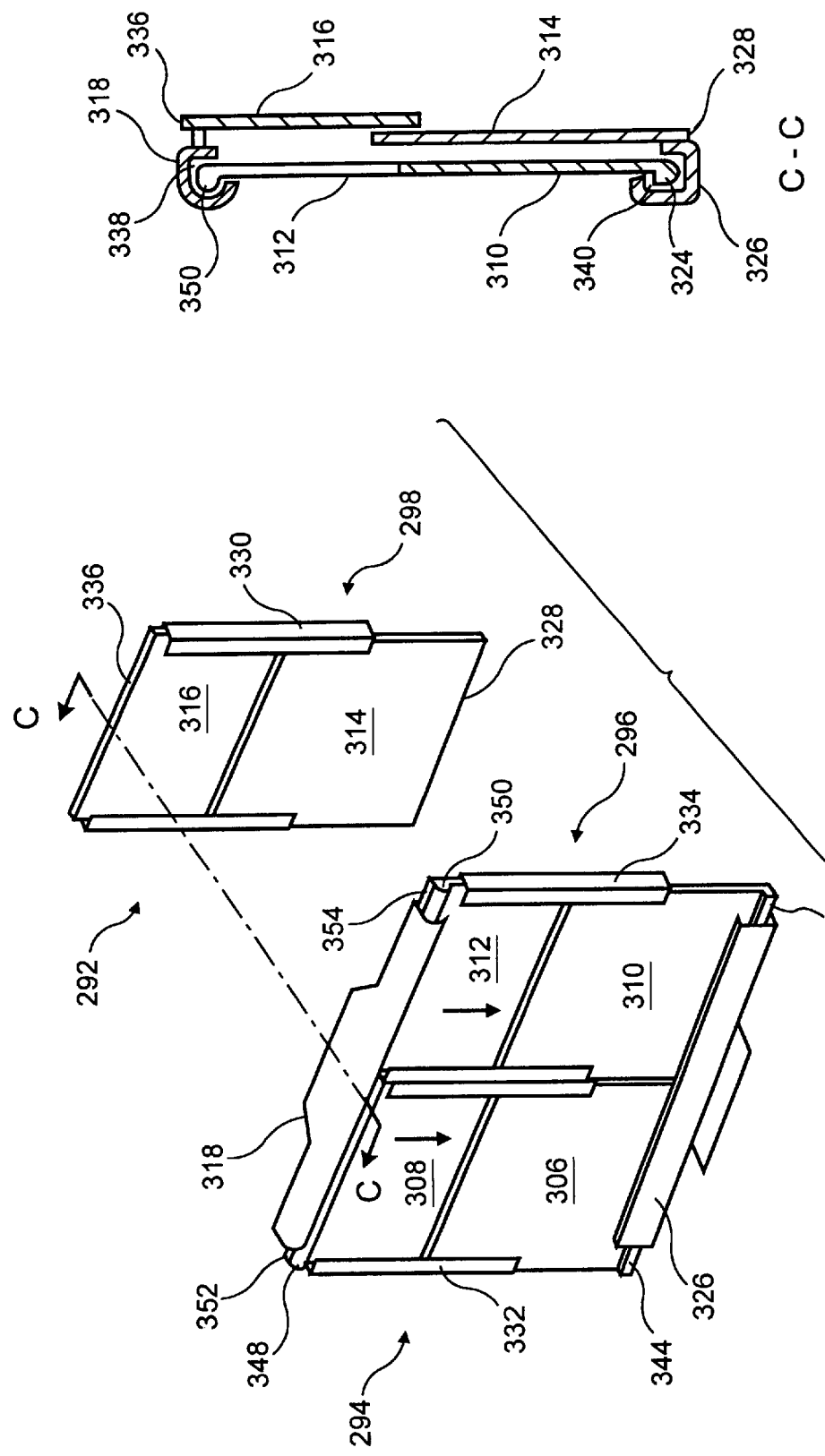

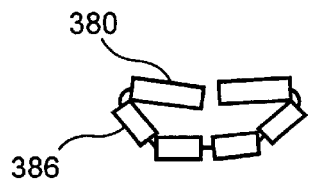
F I G. 54a
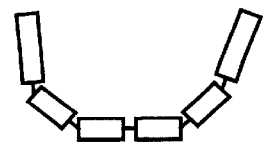
F I G. 54b
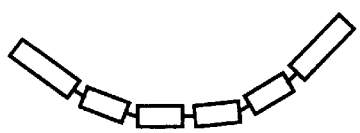
F I G. 54c
F I G. 54d
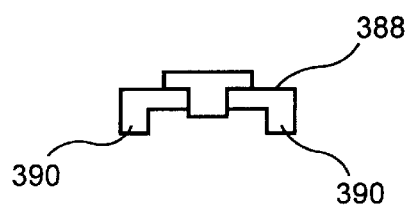
F I G. 55
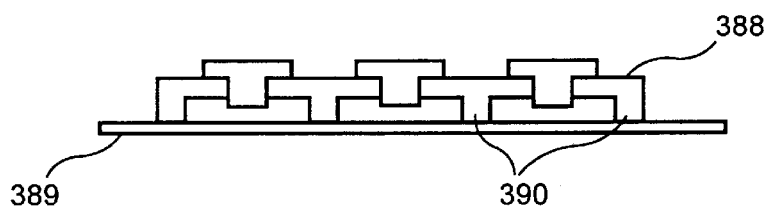
F I G. 56
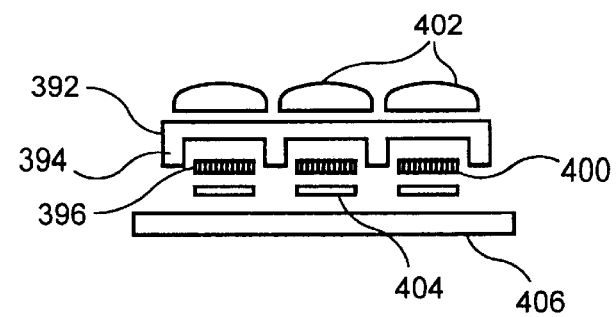
F I G. 57

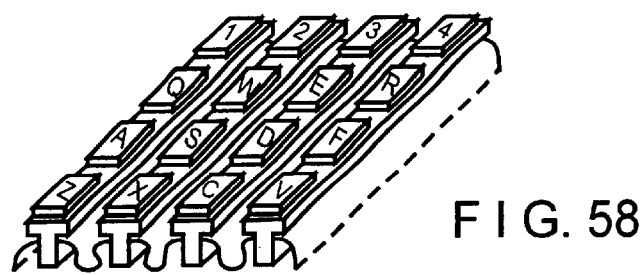
FIG. 58
FIG. 59
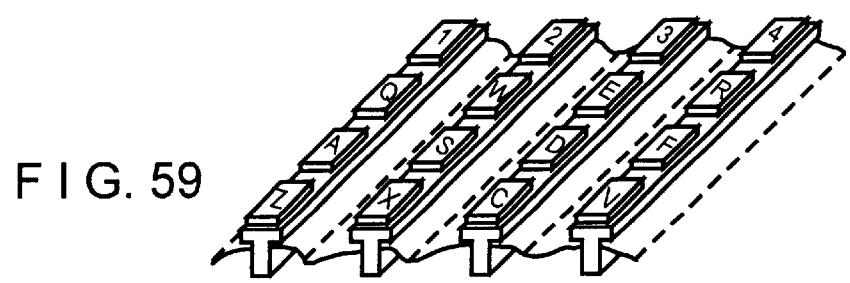
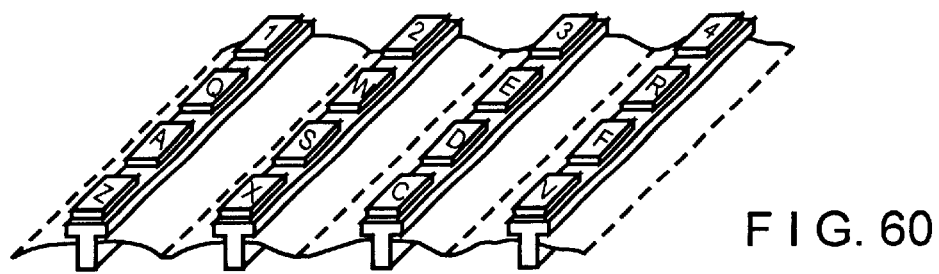
FIG. 60
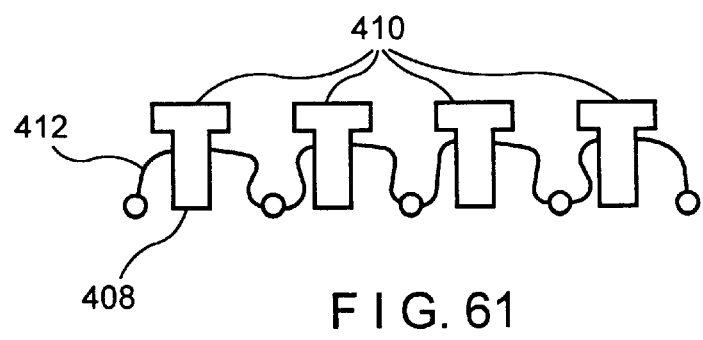
FIG. 61

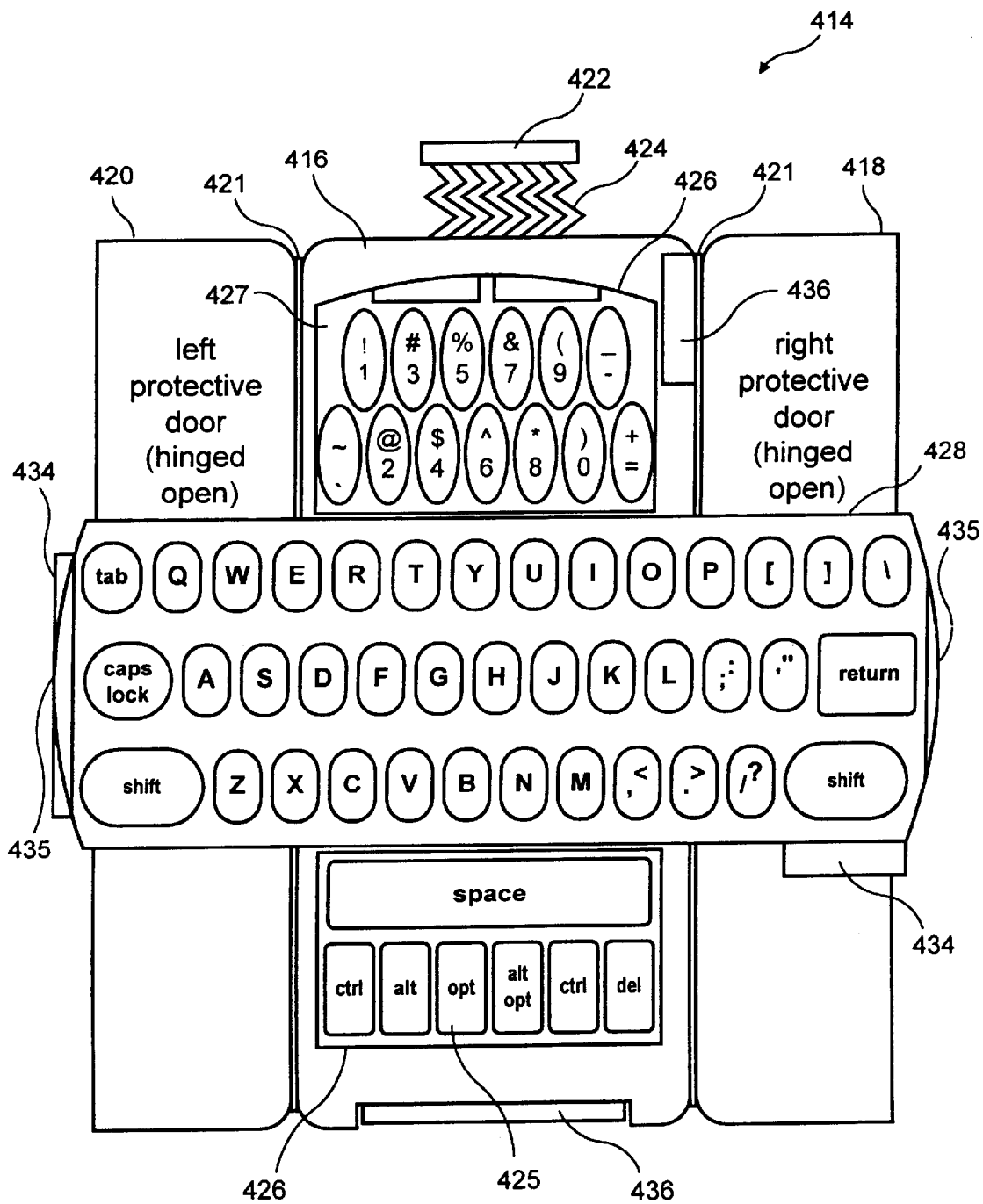
F I G. 71

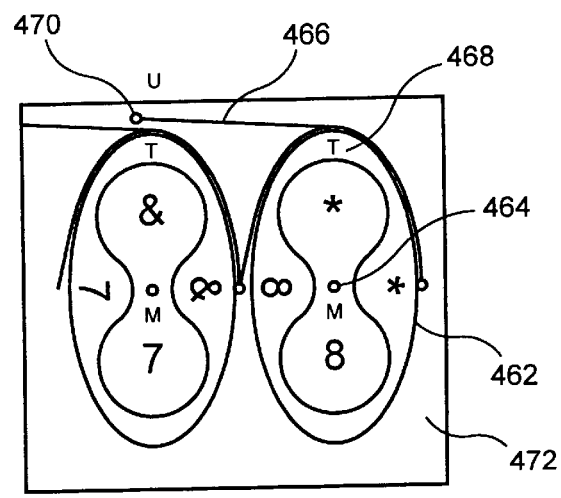
F I G. 74
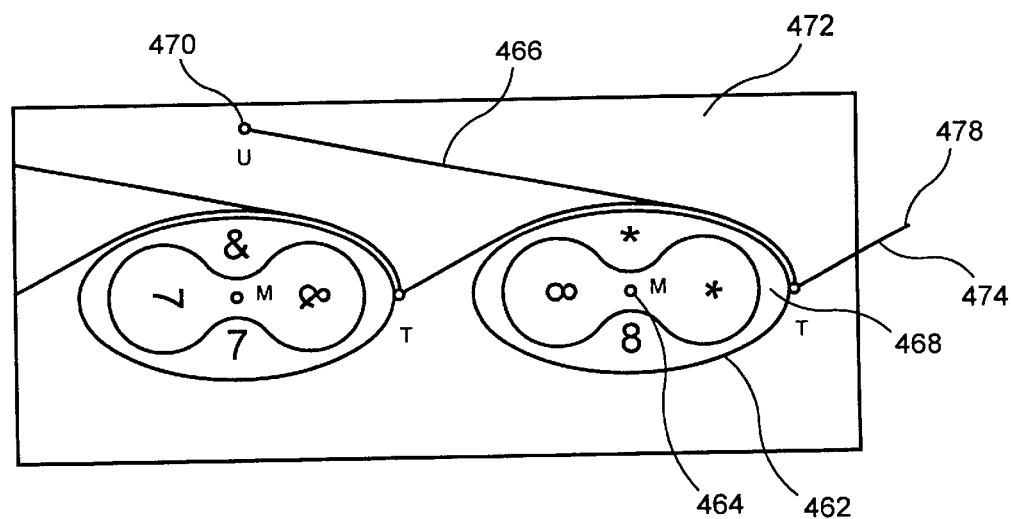
F I G. 75

EXPANDABLE AND CONTRACTIBLE KEYBOARD WITH ADJUSTABLE KEY SIZES

CROSS REFERENCE

This application is a continuation-in-part of application Ser. No. 09/558,866, filed Apr. 26, 2000. This application also claims the benefit of U.S. Provisional Application No. 60/178,936, filed Feb. 1, 2000, U.S. Provisional Application No. 60/221,114, filed Jul. 27, 2000, U.S. Provisional Application No. 60/233,965, filed Sep. 20, 2000, and Provisional Application No. 60/255,295, filed Dec. 13, 2000.

FIELD OF THE INVENTION

The present invention relates to a keyboard apparatus. In particular, the present invention relates to a keyboard which can be adjusted to vary the size of the keyboard, the spacing between the keys, and the size of the keys of the keyboard.

BACKGROUND OF THE INVENTION

For the input of information into computer based equipment (with word processing as a prominent example), typing remains the dominant mode of translating the brain's perception of the desired textual information into a processable data stream of digital information. While touch typing using all of the fingers is the fastest and most often used input system, many information system users successfully input information using only one or two fingers.

Speech recognition systems are becoming more usable, but depend on having a great deal of computer information processing power available to interpret the spoken word and recognize the probable written word form that the sounds represent. Powerful full size laptop or desktop computers are needed to provide the signal processing capability required for even moderately accurate voice recognition. At this time, the voice recognition system must be trained to recognize the voice pattern for a particular speaker, generally using standardized text materials which the prospective speech recognition user must vocalize in training sessions.

Noise cancellation microphones, correctly placed near the mouth, are generally needed to improve the quality of the voice signal that serves as input to the speech recognition system so as to avoid recognition mistakes. The user must usually have a nearby keyboard available to reinstruct or correct the voice recognition system when errors in recognition occur, or if new, possibly complex, words are to be added to the speech recognition library.

Thus, for the near term future, touch typing, using all fingers or just one or two, will remain the most common information input system.

As the use of the internet for email messages or information browsing grows and computer technology provides sufficient information processing power for devices smaller than a standard laptop computer, the desire to use small portable "palm-top" information handling devices for messaging grows very rapidly. Most of these small portable information handling devices use a miniature "QWERTY" alphanumeric keyboard. For information retrieval and entry, the user must use the eraser end of a pencil or a carefully placed fingertip to correctly actuate the very small key button tops.

An alternative method of data entry employs the repeated pressing of the ten numeric keys on a sixteen key dialing keypad. For instance, four presses of the number one could represent the letter A, while five presses of the number two represent the letter B, etc. In this context, the star and number keys are often used to correct incorrect entries. While this system does work, it is cumbersome and time consuming.

While the small keyboards on portable devices can be used to enter information, most people do not find it convenient to put in messages of over one paragraph by pressing the tiny key buttons. Thus, there is a need to make the tiny keyboards "grow" in size to accommodate easy one finger typing, and hopefully, even "touch typing". There are alternative input systems to keyboards, such as the use of a stylus to write on a "touch screen", but thus far, the handwriting or stroke input recognition systems are somewhat inaccurate or slow, so that again, only brief message inputs are practical.

Proposals for compressing and then growing a keyboard in size have previously been made. U.S. Pat. No. 5,141,343 to Roylance et al. teaches a physically expansible/compressible keyboard. That patent discloses key buttons which are the same size as key buttons on a full-size keyboard in which the pitch spacing (center to center dimension between adjacent keys) is variable. Thus Roylance teaches tight packing of the keyboards during device transport, opening out to a usable keyboard during use. The use of key buttons that are the same size as full size key buttons on a standard keyboard limits the size compression. Therefore, the Roylance keyboard is not well suited for really small, fully portable handheld devices, such as those that are markedly smaller than a standard laptop computer. Furthermore, the Roylance device uses a complicated mechanical apparatus to move the keys, increasing manufacturing difficulty and cost.

U.S. Pat. No. 3,940,758 to Margolis discloses a keyboard with several hinged sections. The hinged sections are folded for transport and unfolded for use. While this does achieve a compact transportable device, the stacked sections do not allow the user to have access to the keyboard when compressed. For many short transactions, it is preferable for the user to do single keystroke data input on the fully compressed keyboard, and only expand the keyboard to a larger size when longer data input is required. This function allows the device user to conveniently operate the device in crowded situations, such as in a telephone booth, or during a ride on a bus, taxi, train, plane or commuter van. When the rider reaches the destination, the device can then be expanded for typing convenience during longer data input sessions. For even more convenience, the ultra miniature keyboard, when in expanded mode, may split into two portions and provide fixed or variable angulation, as described in U.S. Pat. No. 4,661,005 to Lahr. The splitting reduces the need for wrist pronation or other "contortions" to use a small size keyboard.

U.S. Pat. No. 5,938,353 to Butler presents the use of key tops which have only one size, but have serrated edges which can interlock together to provide compression in size during compacted form, and teaches the use of handles and detents to aid opening and closing of the serrated key button keyboards between their compacted and expanded sizes. Single section key buttons are a limiting design factor in how compact the keyboard can be made in its compressed state. Multi-section key buttons provide more design flexibility and potentially more potential compression compared to the expanded format keyboard. Also, when the serrated edge key buttons are placed in their compacted form, it may be more difficult to use them "as is" to perform limited data input. Ideally, the user should be able to choose which keyboard mode to use: compacted for ease of travel with no "changeover" efforts for limited data entry, or expanded, for ease in typing of longer documents.

Other means of providing a more convenient keyboard format for longer typing sessions include attaching either a single large keyboard to the smaller data handling device, or in some cases, providing an external two or three section keyboard which can be compacted to make the transport size smaller. Again, these devices do not provide the user with the combination use of a smaller keyboard format for quick typing input, and a larger format for longer typing sessions.

Thus, what is needed is a miniature keyboard in which the key button size as well as the keybutton pitch—i.e. distance between the keys—can grow. The user can utilize "one key at a time" data input operation when the miniature keyboard is compacted to its smallest size, but has the option of physically expanding the keyboard to achieve "touch typing" ease when working with longer data documents. By compacting the key button size as well as the pitch, it is possible to achieve a tiny keyboard for portability, but retain the dual input mode options: (1) one-a-time pressing of the compacted key buttons for limited data input or (2) expansion to a full sized keyboard for more convenient input of longer information segments by touch typing as for creating a one or two page email message for transmission.

SUMMARY OF THE INVENTION

In accordance with the invention, a keyboard with a housing which may be extended from a contracted to an expanded state is provided. At least one elastic belt is attached to the housing, and key switch assemblies are fastened to the elastic belt. When the housing is extended, the elastic belt stretches. Correspondingly, the key switch assemblies move apart, thereby increasing the key pitch and providing an expandable keyboard.

In another embodiment, expandable keytops are mounted to the at least one elastic belt. When the keytops are pressed, they activate the key switch assemblies. The keytops may be made of an expandable material so that they expand and contract as the elastic belt expands and contracts.

In a further embodiment, a plurality of elastic belts is provided. Each elastic belt corresponds to one row of keys in the expandable keyboard.

In a further aspect of the present invention, only certain portions of the keyboard assembly are expandable. For example, it is possible to construct a keyboard in which only the three center rows (i.e. the letter rows) of the keyboard are expandable. Most touch typing occurs on these three center rows, and the numeric rows and other rows of the key are often used as look and press keys.

In another aspect of the present invention, the keyboard is designed as a two part keyboard with a fixed portion and a rotatable portion. In a "carry" mode, the rotatable portion is positioned in a storage position, and covers the fixed portion of the keyboard. To use the keyboard, the rotatable portion is rotated to a "use" mode, and the fixed keyboard is exposed. To further ease typing, the rotatable portion of the keyboard may be designed as an expandable keyboard.

In another embodiment of the present invention, the expandable keyboard is provided with rotatable keytops. The rotatable keytops are fastened to the expandable keyboard in such a manner that when the keyboard is expanded from a compressed position to a fully expanded position, the keytops rotate. The keytops are designed so that the rotation provides a larger key striking surface, improving the ease and accuracy of typing.

Further objectives and advantages of the subject invention will be apparent to those skilled in the art from the detailed description of the disclosed invention.

BRIEF DESCRIPTION OF THE DRAWINGS

FIG. 1 shows a partial perspective view of a keyboard of the present invention.

FIG. 2 shows a cross-section through line A—A of FIG. 1.

FIG. 3 shows a locking latch utilized in the present invention.

FIG. 4 shows a top view of one embodiment the keyboard of present invention that allows the halves of the key board to be adjusted.

FIG. 5 shows the attachment of a keyswitch assembly to an elastic belt.

FIG. 8 shows a top view of an embodiment of the present invention which utilizes applique studs in the contracted state.

FIG. 9 shows a side view of an embodiment of the present invention which utilizes applique studs in the contracted state.

FIG. 10 shows a top view of an embodiment of the present invention which utilizes applique studs in the expanded state.

FIG. 11 shows a side view of an embodiment of the present invention which utilizes applique studs in the expanded state.

FIGS. 28–33 show a supporting and expanding mechanism for an expandable keytop which expands both laterally and longitudinally.

FIGS. 34a–34d show the method of manufacturing a flexible ribbon wire for use in the present invention.

FIG. 35 shows a partial perspective view of an embodiment of the invention which utilizes expandable wire tunnels for the wires.

FIG. 36 shows a top view of the arrangement of a flexible ribbon wire for use in the present invention.

FIG. 37 shows a partial bottom view of the connection between the flexible ribbon wire and membrane pads.

FIG. 38 shows a housing suitable for use in the present invention.

FIGS. 40–42 show an expandable spline used in the expansion framework.

FIG. 48 shows a perspective view of a rear panel suitable for use in the present invention.

FIG. 49 shows a cross-section through line C—C in FIG. 48.

FIGS. 54a–54d show the folding sequence of the expandable keyboard of FIG. 53.

FIGS. 55 and 56 show a stretch belt for use with the expandable keyboard.

FIG. 57 shows the details of one construction of the expandable keyboard.

FIG. 58 shows a tri-mode keyboard in an unexpanded state.

FIG. 59 shows a tri-mode keyboard in a partially expanded state.

FIG. 60 shows a tri-mode keyboard in a fully expanded state.

FIG. 61 shows the construction details of a tri-mode keyboard.

FIGS. 66–71 show a stand-alone version of the expandable keyboard.

FIGS. 72–75 show an expandable keyboard which utilizes rotatable keytops.

DETAILED DESCRIPTION OF PREFERRED EMBODIMENTS

Figure 6:
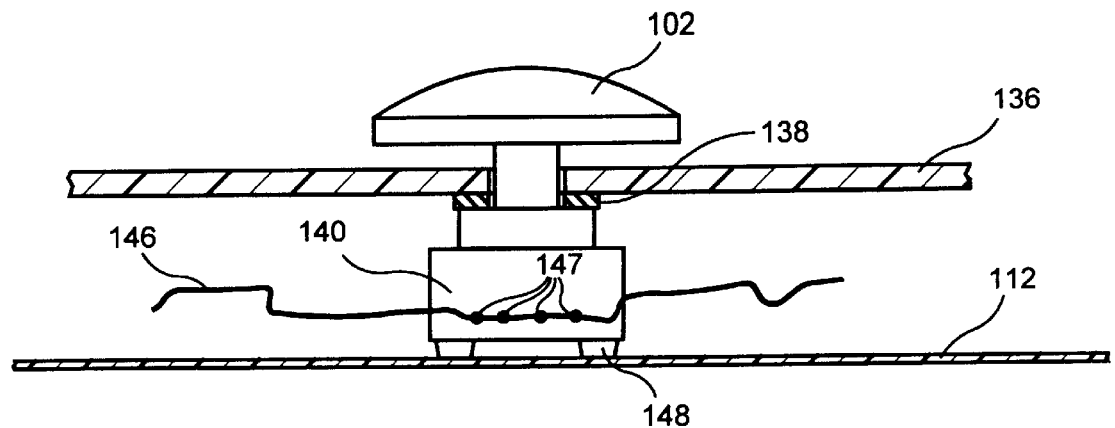
FIG. 6 shows a cross-sectional view of one embodiment of a keyswitch assembly.

The subject invention will now be described in detail for specific preferred embodiments of the invention, it being understood that these embodiments are intended only as illustrative examples and the invention is not to be limited thereto.

FIG. 1 shows an expanded keyboard 100 built in accordance with the present invention. As illustrated by the arrows, the keyboard expands from a closed position to an open position. Upon expansion, the keytops 102 remain the same size in the illustrated embodiment. The key pitch 104, however, is larger in the expanded state than the key pitch in the contracted state.

The keyboard 100 has an expandible and contractible housing 106. The housing is formed of a material which is strong and durable, yet light weight. High density polyethylene is one such material, however, lightweight metal may also be used as well as other plastics. The housing has two members, a right half 108 and a left half 110. Each keyboard half 108, 110 also includes a bottom tray 112R, 112L, respectively. The right half 108 is telescopically attached to the left half 110. The telescopic attachment is achieved in the illustrated embodiment by the interconnection of side walls 116 and 118. Side wall 116 of left half 110 fits within a pocket formed by side wall 118 of right half 108 as shown in FIG. 2. Alternatively, the telescopic attachment may be located on the bottom of the housing, or may take other forms known to those skilled in the art, such as a locking groove arrangement.

A locking latch 120 is located on the side wall 118 to hold the keyboard halves in the expanded position. As shown in FIG. 3B, the locking latch is a flexible tongue 122 with a protuberance (not shown) on the outer side. The protuberance cooperates with a recess 124 in the side wall 116 of the left housing half 114. Although illustrated here on the side wall of the housing, the latch may also be located on the bottom tray $112_R$, $112_L$. Placing the locking latch on the bottom tray allows the sides of the keyboard housing to be constructed from a stretch fabric.

A plurality of elastic belts 128 is provided, one for each desired row of keys. In the illustrated embodiment, two rows of keys are provided. Each elastic belt 128 is attached at its right end 129 to the right edge 131 of the right half of the keyboard, and is attached at its left end 133 to the left edge 135 of the left half 110 of the keyboard. The elastic belts may be attached to the housing by adhesive, clamping, staking, rivets or screws. The length and elasticity of the belts is chosen so that when the housing is in a compressed position, the elastic belt remains taut, while still allowing the keyboard to be fully extended into the expanded position.

Each elastic belt is preferably made of a single direction stretch fabric, similar to those used for waistband belts or shoulder belts for wearing apparel. These single direction stretch fabrics are woven to provide single dimension—i.e. linear—stretch characteristics, unlike Lycra Spandex™ (DuPont), which has two dimensional stretch characteristics. The elastic belt may be constructed from alternative stretchable materials, such as medical rubber. Furthermore, the elastic band may be designed so that it provides some reduction in radio frequency passage by weaving conductive fibers into the elastic band, or by applying electrically conductive coatings to the band.

FIG. 4 illustrates an alternative embodiment of the keyboard of the present invention. In this embodiment, the keyboard is constructed with two expandable and contractible housings 130, 132, one for each half of the keyboard. The two housings are connected together so that they may be adjusted for user comfort, as described in U.S. Pat. No. 4,661,005, which is hereby incorporated by reference. Each keyboard half 130, 132 is constructed so that it is independently expandable.

FIGS. 5–6 illustrate the manner of mounting the switch key assemblies and keytops to the elastic belt. Holes 134 are punched in the elastic belt 136 at the location where keys are to be placed. A glue ring 138 is placed on the underside of the elastic belt around each hole 134. The keyswitch assembly 140 has a mounting ring 142. An operator barrel 144 of the keyswitch assembly 140 is placed through the hole 134, and the mounting ring 142 is placed into the glue ring 138. The glue ring 138 is allowed to cure, thereby fastening the keyswitch assembly to the elastic belt. Key top 102 is then attached to the operator barrel 144. The key top 102 may be attached via a frictional fit, or adhesive may be used. The keyswitch assembly 140 is a standard keyswitch, known to those skilled in the art.

Each keyswitch assembly is connected via a flexible circuit tape 146 to the adjacent keyswitch assembly. The flexible circuit tape is preferably a four conductor ribbon wire, and is connected at four connection points 147 in a manner known in the art, such as soldering. The flexible circuit tape is routed through the keyboard in a manner known to one skilled in the art, and joins all of the keyswitch assemblies to an attached electronic processor device (not shown). When the operator barrel 142 is pressed, the keyswitch assembly provides an electrical response to the attached electronic processor device, indicating that the key has been pressed.

Each keyswitch assembly 140 has runners 148 located on the bottom of the assembly. The runners 148 rest on the bottom 112 of the keyboard halves. The runners are constructed from a material which minimizes friction between the runners and the keyboard bottom trays, such as high density polyethylene. The keyboard bottom trays may be coated with a lubricous material such as Teflon™ (DuPont) to further reduce friction. If a metal tray is used, coating such as Silverstone™ (DuPont) is suitable.

Figure 7:
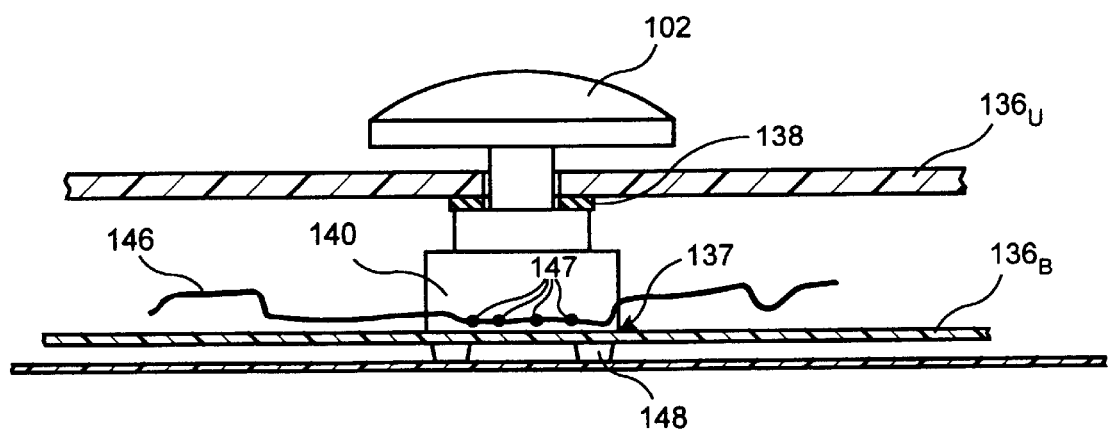
FIG. 7 shows a cross-sectional view of another embodiment of a keyswitch assembly.

FIG. 7 shows a keyboard which utilizes two elastic stretch belts per row of keys, an upper elastic belt $136_U$ and a lower elastic belt $136_B$. In this embodiment, the bottom elastic belt is made of the same material and has the same length and elasticity characteristics as the top belt. The left end of the bottom belt is mounted to the left edge of the left half of the keyboard housing. The right end of the bottom belt is mounted to the right edge of the right half of the keyboard housing. The keyswitch assembly 140 is mounted to the upper belt $136_u$ in the manner previously described. The bottom portion 137 of the keyswitch assembly 140 is attached to the lower elastic belt $136_b$ in any suitable manner, such as gluing. When the keyboard housing 130 is telescopically extended from the contracted position to the expanded position, both belts $136_u$, $136_b$ will stretch with approximately the same amount of tension because they are of the same length and have the same elasticity characteristics. The lower elastic belt $136_b$ therefore assists in keeping the keyswitch assemblies 140 in an upright vertical position.

In an alternative embodiment that is not illustrated, a single elastic belt supports all of the rows of the keyswitch assemblies instead of separate elastic belts for each row of keys. In this embodiment, a single elastic belt which is as wide as the keyboard housing is utilized. All other aspects of the keyboard design are the same as described herein with respect to the multiple belt embodiment. One advantage of the multiple belt embodiment over the single belt embodiment is that each key row may be separately tailored to provide the optimum expansion and compression for that row of keys. For example, in a traditional computer keyboard, the bottom row of keys consists of function keys—such as "control" and "alternate"—and the "space bar." The keytops of these keys are differently sized than the keytops in the adjacent row. By choosing an elastic belt with different stretch characteristics, the bottom row can be expanded differently than the adjacent belt.

The elastic characteristics of the elastic belts may be altered by adding overlay coatings to the elastic belt. The overlay coating may be rigid, which would prevent stretching in the section which is overlaid. Alternatively, the coating may be a stretchable elastomeric coating. A stretchable elastomeric stretch coating would modify the inherent stretch characteristics at the points where the coating is applied but would not totally prevent stretching. The coating may be selectively applied by spraying with an aperture mask, or by pressure coating, as by a tampon coater. By selectively applying the desired coating, the characteristics of the expanded keyboard may be tailored as desired.

FIGS. 8–11 show an alternative embodiment of the present invention. In this alternative embodiment, applique studs 150 are fastened to the elastic belt 136. The applique studs 150 may be fastened by staking them to the elastic belt (as illustrated), or by gluing the studs to the elastic belt. The applique studs surround each keytop 102, and are of various heights. In the illustrated embodiment, the studs at the left and right edges 151, 153 of the keytop 102 are longer than those at the top and bottom edges 155, 157 of the keytop 102. In the compressed position of the keyboard illustrated in FIGS. 8 and 9, the applique studs 150 are located near the keytops. In the expanded position of the keyboard illustrated in FIGS. 10–11, the applique studs are located further away from the keytops. In operation, the applique studs will direct a slightly misplaced keystroke by a user's finger 152 towards the center of the keytop. This can improve typing accuracy.

Figure 12:
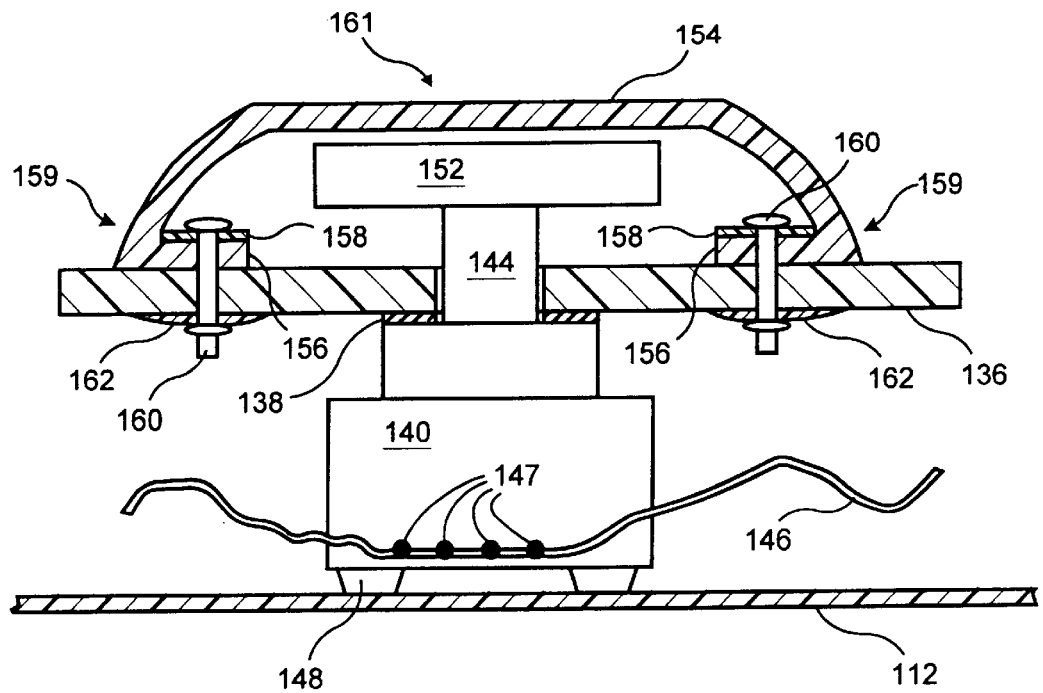
FIG. 12 shows a cross-section of a keyswitch assembly which utilizes a foamed plastic rubber overcap keytop in a contracted state.
Figure 13:
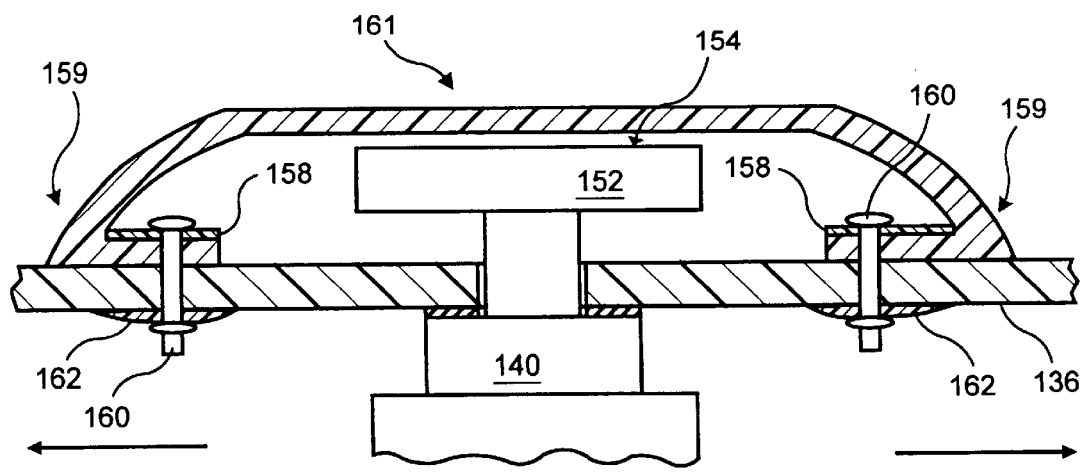
FIG. 13 shows a cross-section of a keyswitch assembly which utilizes a foam overcap keytop in an expanded state.

FIGS. 12–13 show an alternative embodiment of the present invention with expandable key tops. In this embodiment, the elastic belt 136 is prepared in the same manner as previously described, and the keyswitch assembly 140 is fastened to the elastic belt in the same manner as previously described. An inner strike plate 152 is attached to the operator barrel 144. The expandable keytops 154 are constructed from a stretchable material. One suitable material may be skinned foam. A retaining ridge 156 is molded into the key top. A gusset plate 158 is placed over the retaining ridge, and stakes 160 are placed through the gusset plate 158 and through the elastic belt 136. A plastic washer 162 is placed over the stake 160 so that it is adjacent to the elastic belt, and the stake is affixed to fasten the keytop 154 to the elastic belt. In operation, when a user strikes the keytop 154, the keytop 154 deflects downward and presses the strike plate assembly 152. This operates the operator barrel, which sends an electrical response to an attached electronic device (not shown) through the flexible circuit tape 146. As an alternative to staking, the keytop may be fastened to the elastic belt with adhesive. FIG. 13 shows the expandable keytop in an expanded position. When the elastic belt 136 is stretched by the movement of the keyboard housing from a contracted state to an expanded state, the plastic stakes 160 are moved apart. Correspondingly, the edges 159 of the stretchable keytop 154 are pulled apart. In this manner, the keytop is expanded and provides a larger keytop striking surface 161 for the typist's fingers when the keyboard is in an expanded mode.

Figure 14:
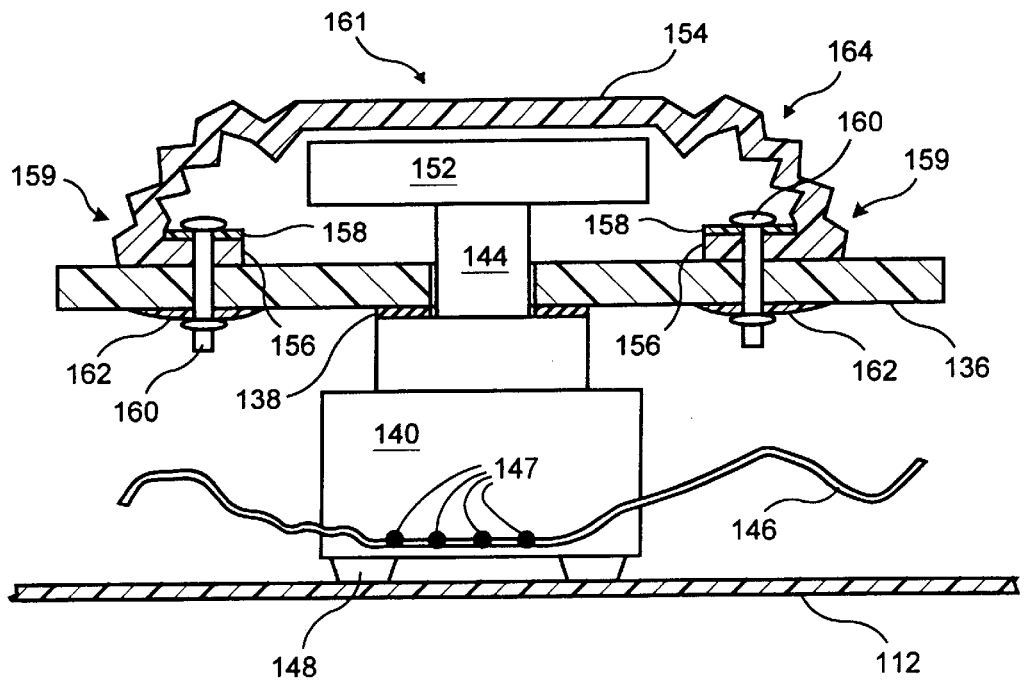
FIG. 14 shows a cross-section of a keyswitch assembly which utilizes a foam overcap keytop with pleated edges in a contracted state.
Figure 15:
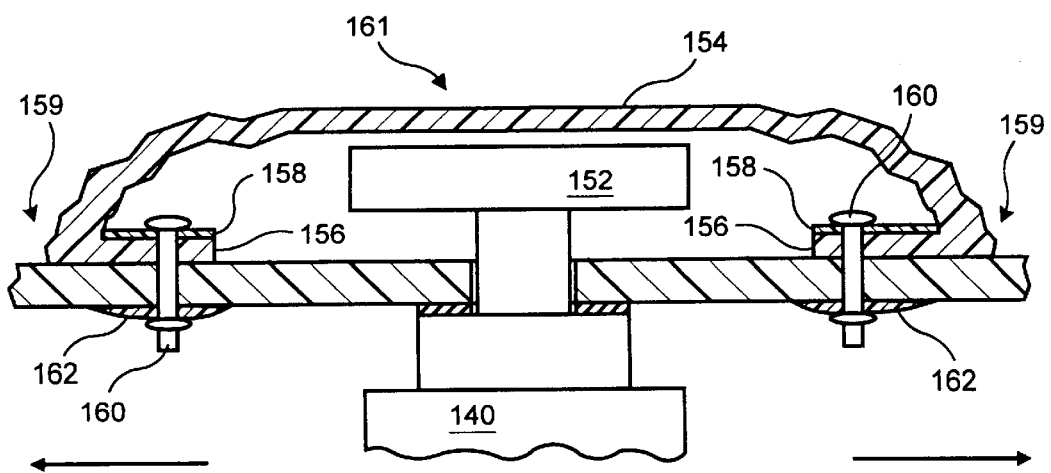
FIG. 15 shows a cross-section of a keyswitch assembly which utilizes a foam overcap keytop with pleated edges in an expanded state.

FIGS. 14 & 15 show an alternative expandible key top in the compressed and expanded positions, respectively. This keytop is similar to the keytop shown in FIGS. 12 and 13, except the edges 159 of the expandable keytop are molded to include expandable pleats 164. The expandable pleats 164 provide additional expansion capabilities to the keytop.

Figure 16:
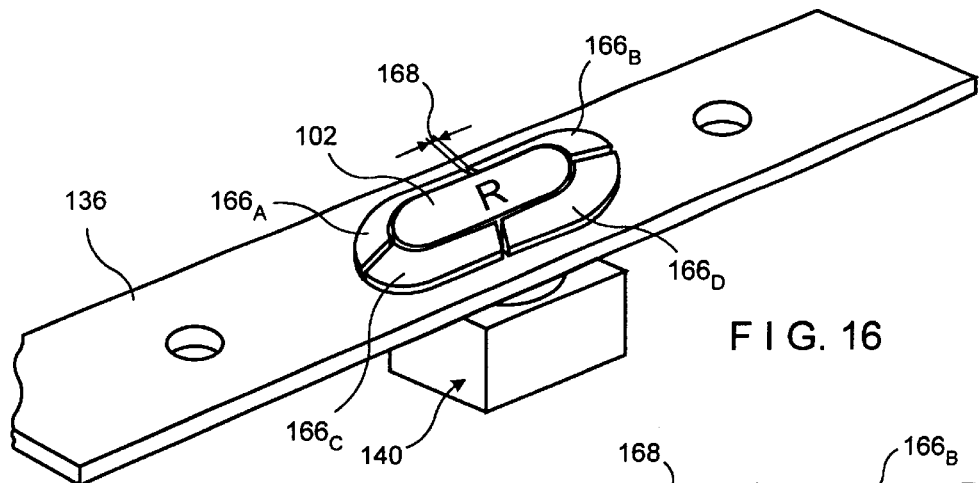
FIG. 16 show a partial perspective view of a row of keys which utilize segmented key tops.
Figure 17:
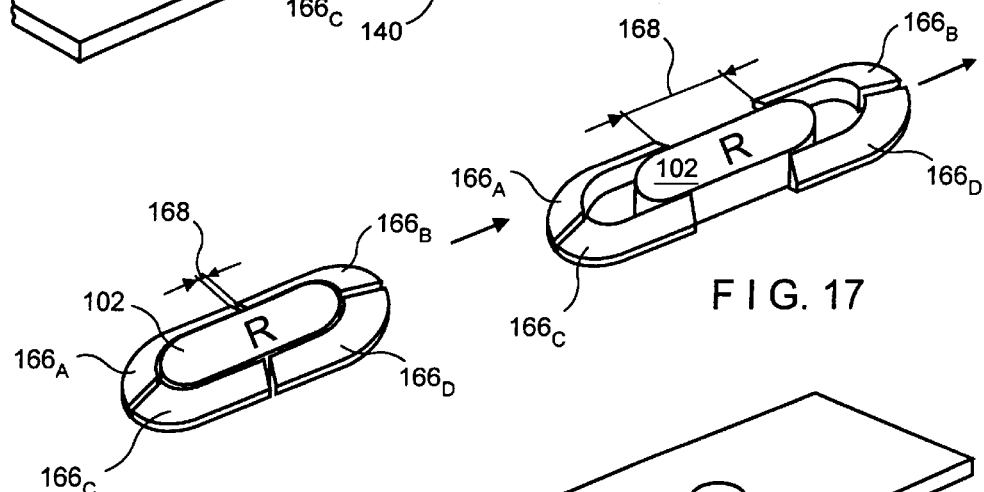
FIG. 17 shows a partial perspective view of a key top with associated segmented key tops.

FIGS. 16–17 show an embodiment of the expandable keyboard that utilizes key segments $166_A$, $166_B$, $166_C$, $166_D$. The keyswitch assembly 140 is glued to the elastic belt in the manner previously described. The key top 102 is frictionally fit to the operator barrel 142 (not illustrated) of the keyswitch assembly. Four key segments $166_A$, $166_B$, $166_C$, $166_D$ are arranged around the keytop 102. Each of the key segments is attached to the elastic belt 136 by any suitable means, such as gluing or staking. In the contracted position illustrated in FIG. 16, the key segments $166_A$, $166_B$, $166_C$, $166_D$ are located adjacent the key top 102, with only negligible gaps 168. Upon movement of the keyboard from a contracted position to an expanded position, the elastic belt 136 is stretched. Accordingly, the key segments 166 are moved laterally away from the key tops, increasing the size of gaps 168. In use, the key segments direct a user's fingers towards the keytop thereby providing a larger effective key striking area. Although illustrated and described with four key segments, any number of segments may be used to achieve the same results.

Figure 18:
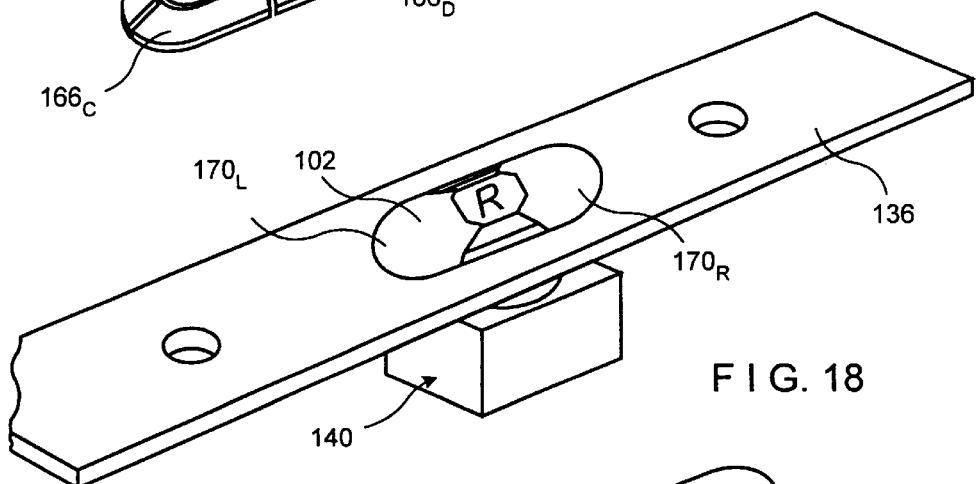
FIGS. 18–21 show an embodiment of the keyboard which utilizes key overshells.
Figure 19:
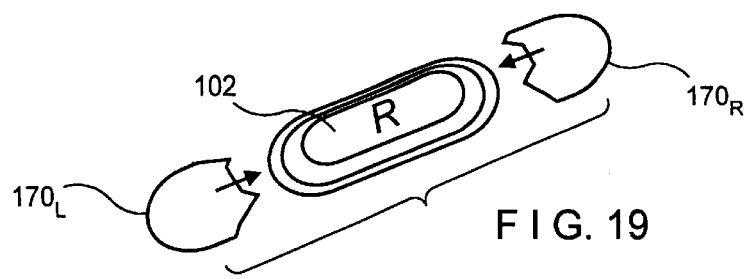

FIGS. 18–21 show key button overcaps suitable for use with the present invention. In this embodiment, the keyswitch assembly 140 is glued to the elastic belt 136 in the manner previously described. The key top 102 is attached to the operator barrel of the keyswitch assembly. Right and left key button overcaps $170_R$, $170_L$ are provided for each key. Each of the key button overcaps is attached to the elastic belt 136 by any suitable means, such as gluing or staking the overcap to the elastic belt. As shown in FIG. 18, when the keyboard is in a contracted position, the overcaps 170 cover a substantial portion of the key top 102, so that only the enscribed keybutton name is visible. When the keyboard is in the expanded position shown in FIG. 21, the key button overcaps 170 move outward laterally from the keytop 102, exposing a greater surface area of keytop 102.

Figure 20:
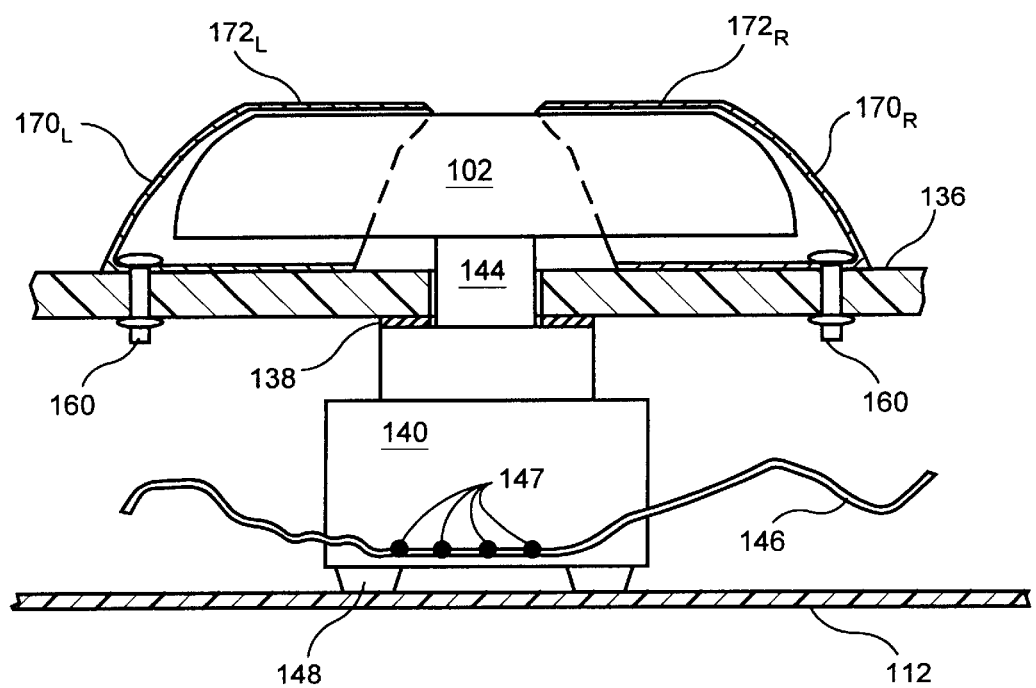
Figure 21:
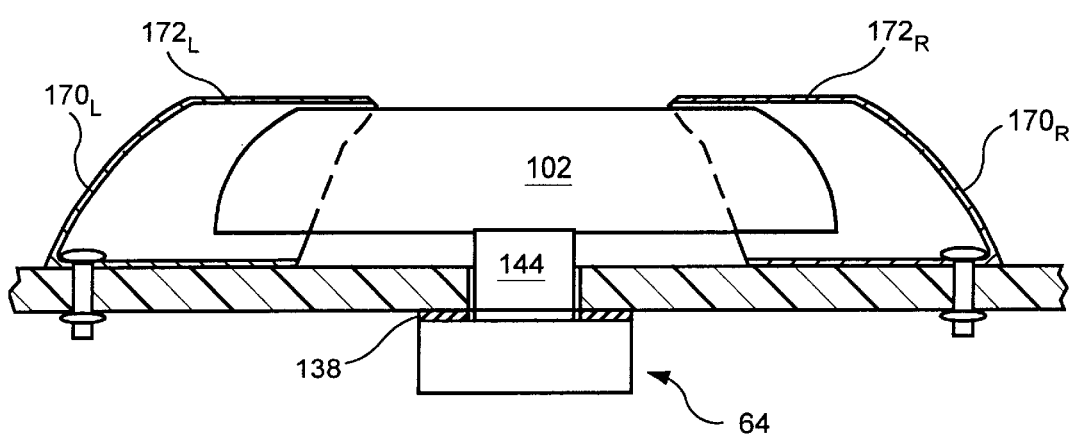

The construction of the key button overcaps is shown in more detail in FIG. 20, which illustrates a keyswitch assembly utilizing key button overcaps in a contracted state. Each key button overcap $170_L$ and $170_R$ has a corresponding extending edge $172_L$, $172_R$. The extending edges overlay the keybutton and are constructed from a flexible material. FIG. 21 illustrates the same keyswitch assembly as FIG. 20 in an expanded state.

In operation in the contracted state illustrated in FIG. 20, a user may press either on the key top 102, which directly activates the keyswitch assembly, or may press on the extending edges $172_L$ or $172_R$, which will contact and operate key top 102 indirectly due to their flexibility. Similarly, in the expanded state illustrated in FIG. 21, an operator may press on either the key top 102 or flexible edges 172 to operate the keyswitch. Accordingly, the key button overcaps provide a larger key striking zone in the expanded state without causing a corresponding decrease in the size of the striking zone in the contracted state.

Figure 22:
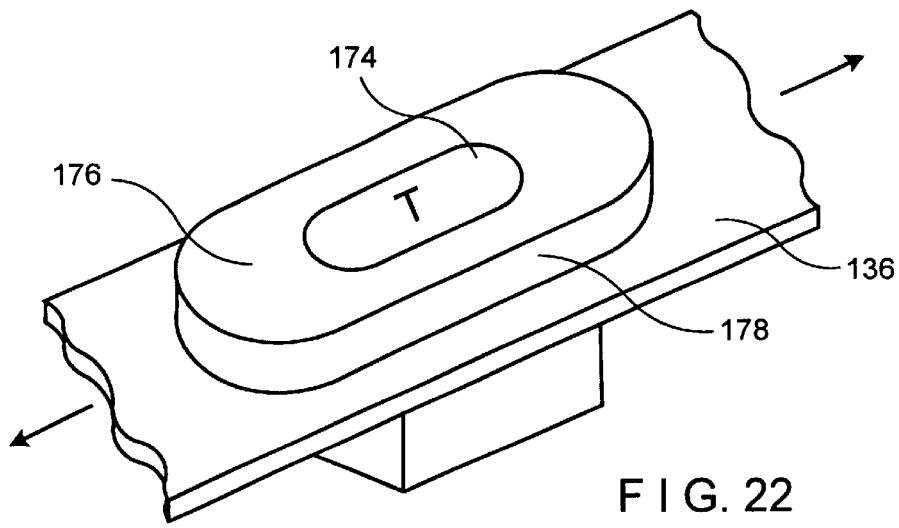
FIGS. 22–24 show a keytop which is expandable.
Figure 23:
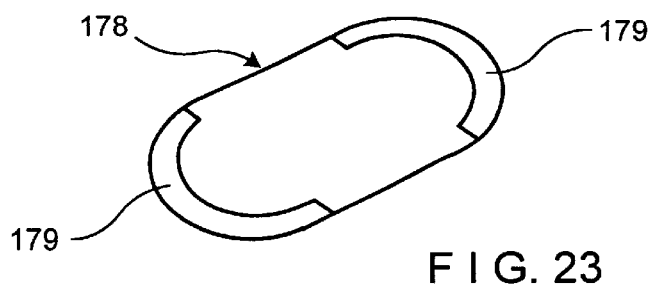
Figure 24:
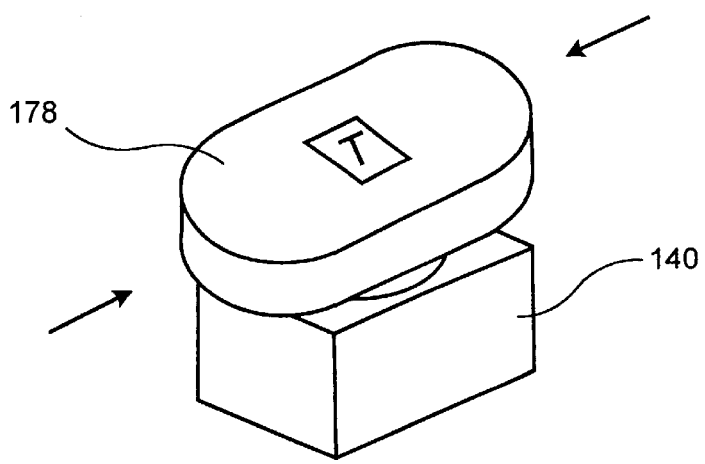

FIGS. 22–24 show another embodiment of a keytop 178 of the present invention. This embodiment of the keytop includes an inner keytop portion 174 and an outer keytop portion 176. The inner keytop portion is formed from a substantially solid material, such as polyethylene. It is sized so that it supports the entire character zone of the keytop. The bottom surface of the inner keytop portion is adapted to cooperate with an inner strike plate (as illustrated in FIGS. 12 and 13). The outer keytop portion 176 is cast of a readily stretchable material, such as elastomeric foam, with the inner keytop integrally cast in place. The keytop 178 is then mounted to the elastic belt by applying glue strips to gluing strips 179 at the end portions of the underside of the keytop 178, as shown in FIG. 23. The glue strips are then adhered to the elastic belt 136 while the belt is in the contracted position. Alternatively, the end portions may be staked to the elastic belt. When the keyboard is moved from a contracted position to an expanded position, the elastic belt 136 is stretched laterally. Correspondingly, the keytop 178 is stretched laterally, providing an expanded keytop striking surface.

Figure 25:
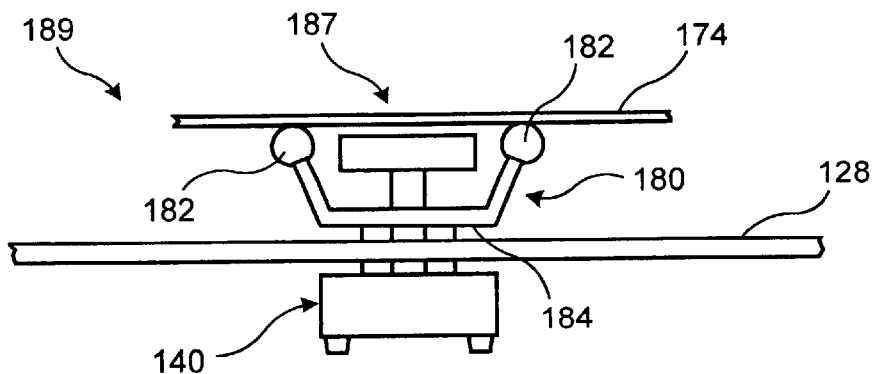
FIGS. 25–27 show a mechanism for supporting an expandable keytop.
Figure 26:
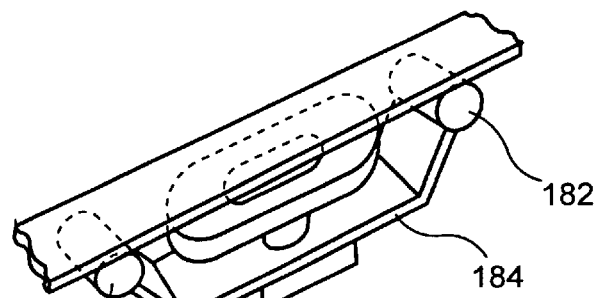
Figure 27:
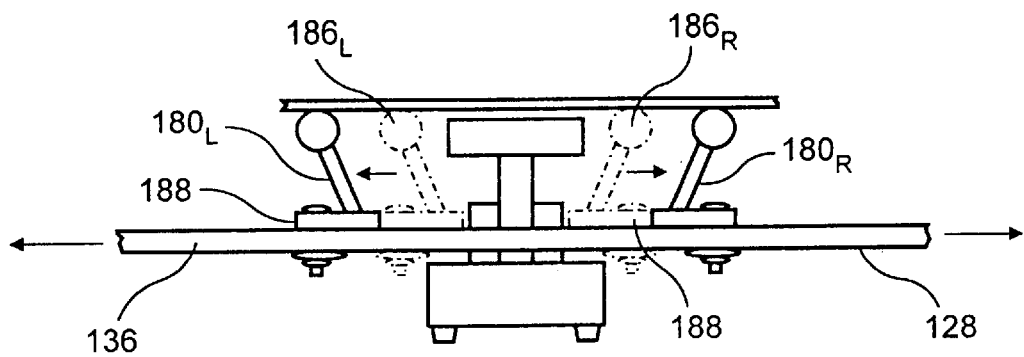

One potential drawback of using expandable keytops made of elastomeric foam is that the center portion of the keytops may tend to sag. To eliminate this drawback, support structures may be provided, as shown in FIGS. 25–27. In the embodiment of the support structure illustrated in FIGS. 25 and 26, the support structure 180 includes two suspension guide bars 182 mounted to a support plate 184. Each guide bar is located at one side of an expandable keytop 174 (partially shown). The support plate 184 is mounted to the keyswitch assembly 140 by any suitable means, such as gluing. When the keyboard is moved from a contracted state to an expanded state, the support structure 180 moves with the keytop. Thus, the guide bars 182 will support the center section of the expandable keytop.

As shown in FIG. 27, the support structure may alternatively be constructed from two supporting pieces $180_L$, $180_R$ for each keytop. Each supporting piece has a guide bar 186 attached to a supporting plate 188. The supporting plate is attached to the elastic belt 136 by any suitable means, such as staking or gluing. Each supporting piece is located so that the guide bars $186_L$, $186_R$ are in the center 187 of the expandable keytop 189. When the keyboard is moved from a contracted state to an expanded state, the supporting pieces $186_L$, $186_R$ move to the areas indicated by dotted lines. In this manner, the guide bars $186_L$, $186_R$ support the center 187 of the keytops 189. Since the guide bars are not rigidly connected together, when the keytop is pressed, a user's fingertip will tend to deflect the suspension guide bars. This will help deflect the fingertip to the center of the key, assuring a firm keystrike.

FIGS. 28–33 illustrate an alternative embodiment of the present invention which expands the keytop elements in the vertical direction. A sled 190 is provided on each side of a keyswitch assembly 140. The sled is attached to the elastic belt 136. End shape definer rods 192 are pivotally mounted to the sleds at one end 191, and at the other end 195 have a definer ball 193. A cam plate 194 is provided at each side of the sled. As illustrated in FIG. 29, each cam plate has a proximal end 196 and a distal end 198. The cam plate is narrower on the proximal end 196, and progressively widens as it reaches the distal end 198. Each cam plate is fixedly mounted to a keyswitch assembly 140 by a support plate 200. When the keyboard is moved from the compressed state to the expanded state, the elastic belt moves the sleds 190 away from the keyswitch assembly 140. The cam plates 194 force the end shape definer rods apart. The definer balls 193 press against the inside corner of the keytop surface material. Thus, when the keyboard is moved from a contracted state to an expanded the definer ball presses against the inside corners of the keytop, forcing the keytop to expand.

With this mechanism, the keytops may be covered with two dimensional elastic fabric. One suitable fabric is Spandex™. Because the covering is elastic, it will drape over the definer balls. When the keytop is pressed, the center of the keytop will sag slightly more than the outside edges. This forms a concave well. The user's fingertip will be guided into this well. This helps position the user's finger directly over the underlying keyswitch assembly, assuring a solid key stroke and reducing typing errors. The covering material is held to the elastic belt by adhesive and/or staking clips.

FIGS. 34a–34d illustrate a method of forming a flexible circuit tape for use in the present invention. The circuit tape 202 is preferably formed from a flat four conductor ribbon wire. As shown in FIG. 34b, two forming dies are provided, a movable forming die 204 and a fixed forming die 206. Each forming die has a plurality of forming bars 208. The forming bars are spaced so that the movable forming set may be moved through the fixed forming set without interference. In operation, the forming dies 204, 206 are placed in the starting position shown in FIG. 34b, and a flexible circuit tape 202 is placed between the forming dies. The movable forming die is moved from the starting position to the final position shown in FIG. 34c. The spacer bars form accordion folds 210 in the ribbon wire, forming the flexible circuit tape, as illustrated in FIG. 34d. The accordion folds allow the wire to expand and contract when the keyboard is moved from an expanded to contracted position and vice versa.

To prevent the flexible circuit tape from becoming tangled during the expansion and contraction of the keyboard, the circuit tape may be placed inside a wire tunnel as illustrated in FIG. 35. The wire tunnel 218 is formed by using two elastic belts 212, 214, which are joined together at joining seams 216, forming a tunnel 218 there between. The circuit tape 202 is placed within this tunnel, which prevents wires from becoming tangled. Preferably, in this embodiment, keyswitch membrane pads 220 are used instead of keyswitch assemblies. It is preferable that the keyswitch membrane pads 220 are solidly fixed to the elastic belt.

To connect the membrane pads together, it is preferable to turn the wire 180 degrees at turning points 222 between keyswitch membrane pads, as illustrated in FIG. 36. Accordingly, the finished connection will appear as shown in FIG. 37, with accordion folds 202 alternating between membrane pads 220.

In another embodiment of the keyboard illustrated in FIGS. 38–47, the keyboard can expand both in the longitudinal direction 236 and in the lateral direction 238. As seen in FIG. 38 the keyboard has a housing 224 formed of a first housing part 226, second housing part 228, third housing part 230, and fourth housing part 232. Each housing part is telescopically attached to the adjacent housing part. An expansion mechanism 234 is mounted within the housing 224.

Figure 39:
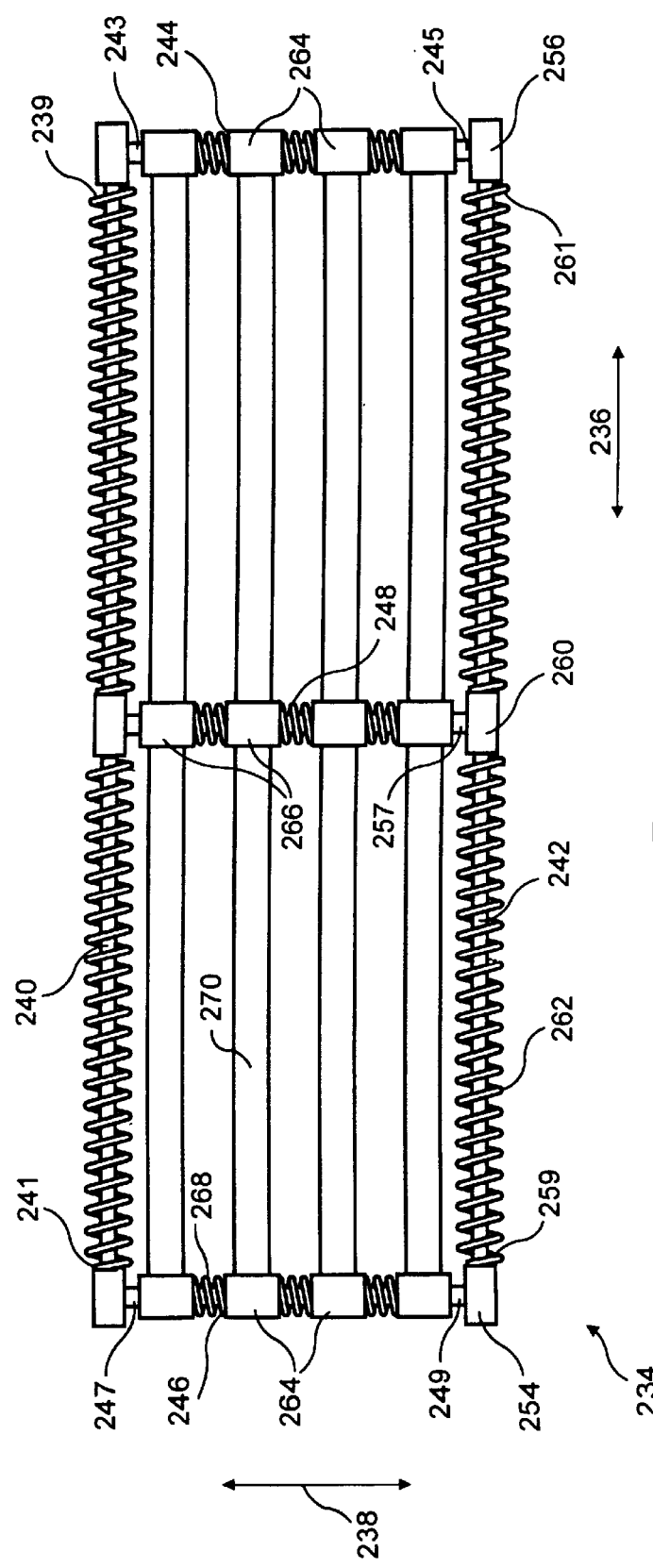
FIG. 39 shows an expansion framework suitable for use with the present invention.

As illustrated in FIG. 39 the expansion mechanism 334 has a top frame bar 240, a bottom frame bar 242, a right frame bar 244, a left frame bar 246, and a middle frame bar 248. Each frame bar is formed from a pair of interlocking spline bars 356. The interlocking spline bars are extendible from a compressed position to an expanded position. A first coupler 250 attaches the left end 241 of the top frame bar to the top end 247 of the left frame bar 246. A second coupler 252 attaches the right end 239 of the top frame bar 240 to the top end 243 of right frame bar 244, a third coupler 254 attaches the left end 259 of the bottom frame bar 242 to the bottom end 249 of the left frame bar 246, and a fourth coupler attaches the right end 261 of the bottom frame bar 242 to the bottom end 245 of the right frame bar 244. Fifth and sixth couplers 258, 260 attach the middle frame bar 248 to the top and bottom frame bars in the centers 255, 257 of the top and bottom frame bars respectively. Horizontal coil springs 262 are placed between the frame couplers and over the top and bottom frame bars. The coil springs 262 are chosen so that in the expanded position, they provide slightly more force than the tension of the elastic bands. The first, second, third and fourth couplers 250, 252, 254, 256 are attached to the first, second, third and fourth housing parts 226, 228, 230, 232.

Mounted to the right and left frame bars 244, 246 are a series of end row couplers 264. An end row coupler is provided at each end of a row of keys. Each end row coupler is slidably mounted on a frame bar. Middle row couplers 266 are provided for each row of keys. A vertical coil spring 268 is placed between each adjacent end row coupler 264 and between each adjacent middle row coupler 266.

Figure 43:
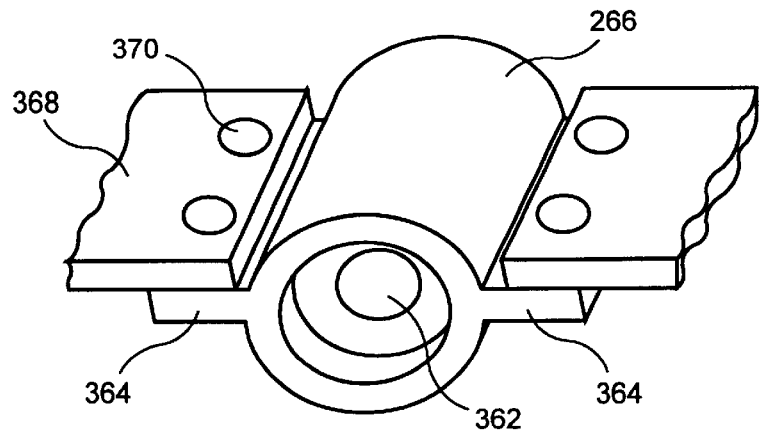
FIG. 43 shows a perspective view middle coupling joint used in the expansion frame work.
Figure 44:
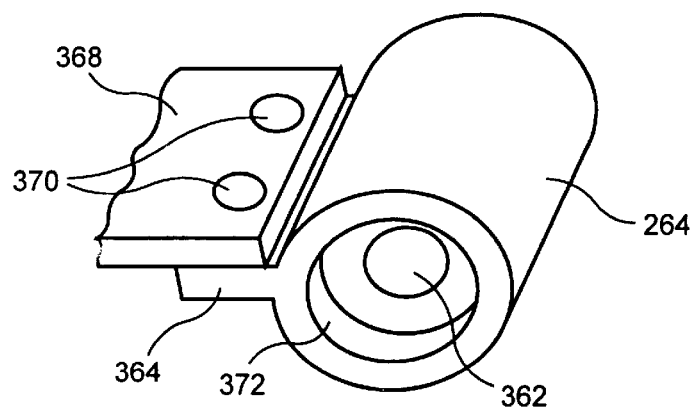
FIG. 44 shows a perspective view of an end coupling joint used in the expansion frame work.
Figure 45:
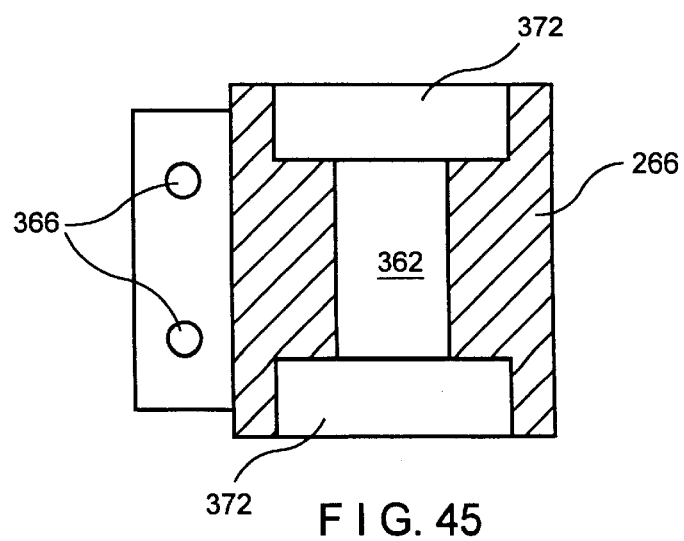
FIG. 45 shows a cross-sectional view of an end coupling joint used in the expansion framework.

FIGS. 43–45 illustrate the details of the end row couplers 264 and middle row couplers 266. The end row coupler has a bore 362. A belt attachment plate 364 has two stake attachment points 366. An elastic belt 368 is attached by stakes 370 to the end row coupler. The end row couplers have two spring recess seats 372. When placed over the spline bar, the vertical coil springs rest on the spring recess seats 372. The construction of the middle row coupler 266 is similar to the construction of the end row coupler 264, except the middle row coupler has two belt attachment plates 364.

A plurality of elastic belts 270 is provided to support the keyswitch assemblies (not shown), and are attached to the row couplers at each end. Preferably, in this embodiment, the elastic belts 270 are formed into wire tunnels as previously described. The keyswitch assemblies are fastened to the plurality of elastic belts 270 in the manner previously described. An elastic wire tunnel 270 connects each middle row coupler 266 to the adjacent middle row coupler 266. A flexible circuit tape may then be routed through these tunnels and into each row tunnel.

FIGS. 40–42 show an expandable spline 356 used in the expansion framework. Each expandable spline 356 has a male portion 358 and female portion 360. The male and female portions 358, 360 are formed so that they mate together, as illustrated in FIG. 42, and allow the pieces to extend and contract in the directions indicated by the arrows.

Figure 39A:
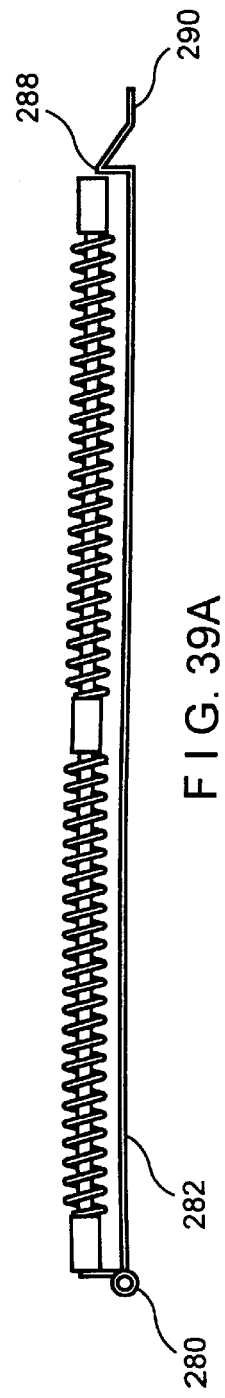

As seen in FIG. 39A, a first horizontal pivot bar 280 is attached to the left frame bar 246. A horizontal detent bar 282 is pivotably mounted to the pivot bar 280. The detent bar includes a latch 288 and a handle 290. The latch 288 cooperates with the right edge of the keyboard to lock the keyboard into a compressed position. Similarly, a vertical pivot bar is attached to the top of the frame. A vertical detent bar is pivotable mounted to the vertical pivot bar. The vertical detent bar includes a latch which cooperates with the bottom edge of the keyboard.

Figure 47:
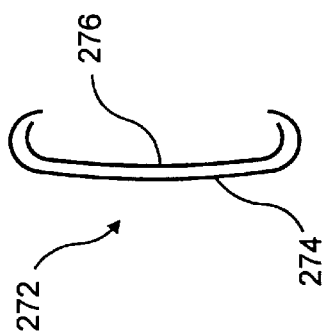
FIG. 47 shows a cross-section through line B-13 in FIG. 46.
Figure 46:
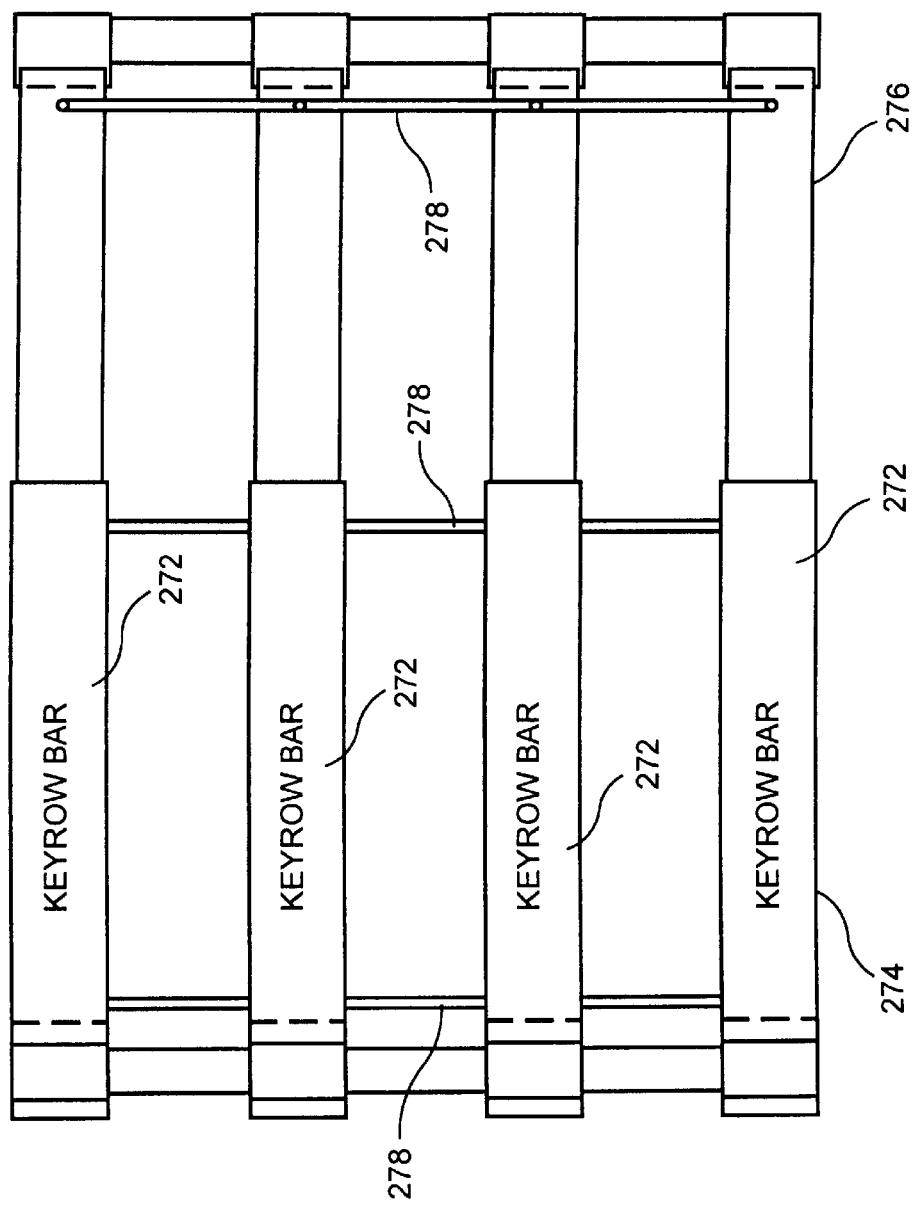
FIG. 46 shows an embodiment of the invention which used parallel support bars.

A supporting mechanism should be located under the keyswitch assemblies to support the keyswitch assemblies and to assure a firm keystrike when a user presses the keytop. One method to accomplish this is a series of parallel supporting bars 272. One bar is provided for each desired row of keys, and provides support for the keyswitches in that row. Each parallel supporting bar 272 has a left half 274 and a right half 276. The halves 274, 276 of the supporting bars are connected to the end row couplers 264 and middle row couplers 266. The left half 274 and the right half 276 of the bars have a cross-section as shown in FIG. 47. This allows the parallel supporting bars to be extended from a contracted position to an expanded position.

To keep the keyboard from expanding too much and to assure even spacing of the rows of the keyboard, a plurality of limit cords 278 are provided. Each limit cord 278 connects adjacent couplers in a column. Accordingly, when the keyboard is expanded, the limit cords will limit the amount of expansion to the length of the cord. When the keyboard is compressed, the limit cords become slack.

In operation, the keyboard is expandable from a compressed size to an expanded size. A user operates the vertical detent bar to release the detent. The vertical coil springs 268 exert force against the end row couplers 264, forcing the couplers and the associated right and left frame bars 244, 246 to expand. The limit cords 278 limit the total vertical expansion of the keyboard. The limit cords also assure that the spacing between the parallel supporting bars 272 is even. The user can then operate the horizontal detent bar 282 to release the horizontal detent. The horizontal coil springs 262 will then exert force against the end couplers, forcing the keyboard to expand in the longitudinal direction 236. Alternatively, the sequence of expansion may be reversed, or the keyboard may be used while the keyboard is expanded only in one direction. To compress the keyboard, a user presses against the edges of the keyboard to overcome the force exerted by the springs, and operates the detent mechanisms to lock the keyboard into the compressed position.

In another embodiment of the invention illustrated in FIG. 49 which expands both vertically and horizontally, an expandable rear plate 292 is used to support the keyswitch assemblies. The rear plate 292 is formed from a left front plate pair 294, a right front plate pair 296, and a back plate pair 298. The back plate pair 298 is formed from a first rear plate 314 slidably mounted to second rear plate 316 by channels 330. The right front plate pair 296 is formed from first front plate 306 attached to second front plate 308 by channels 332. The left front plate pair 294 is formed from third front plate 310 slidably attached to fourth front plate 312 by channels 334. An upper guide 318 is fixedly attached to the top edge 336 of the second rear plate 316. A lower guide 326 is fixedly attached to the lower edge 328 of first rear plate 314. Channels 338, 340 are formed in the upper and lower guides 318, 326. Beads 324, 342 located on the lower edges 344, 346 of the first and third plates 306, 310 are restrained in the channel 340 so that the plates may be moved horizontally, but not vertically. Similarly, beads 348, 350 on the top edges 352, 354 of the second and fourth front plates 308, 312 are located in the channel 338 in the upper guide 318. The top and bottom edges of the plate pairs slide in guideways in the housing. The left end right edges of the plate pairs are attached to end plates that form the end of the housing. Horizontal limit cords (not illustrated) prevent the keyboard from being overexpanded.

In operation, a user grasps the handle and pulls the handle in the direction indicated by the arrows. This causes the plate pairs to expand in the vertical direction. The user can then grasp the left and right edges of the frame plates, and pull the frame in a longitudinal direction to expand the keyboard horizontally. This assures that there is a supporting back plate under the entire keyboard.

Figure 50:
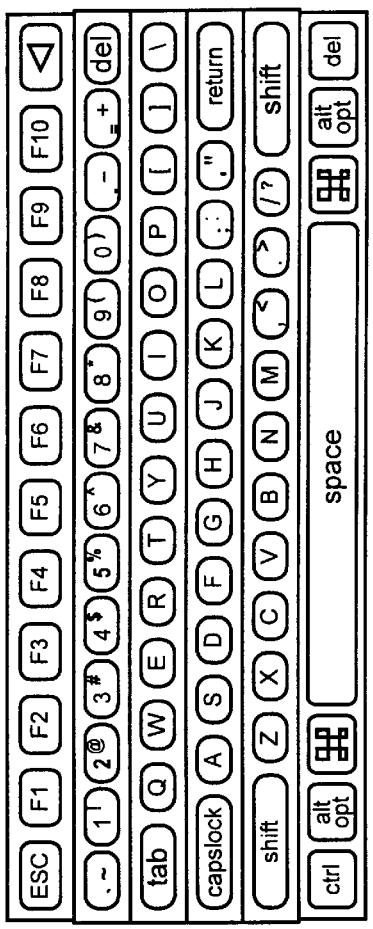
FIG. 50 shows an embodiment of the keyboard in the compressed state.
Figure 51:
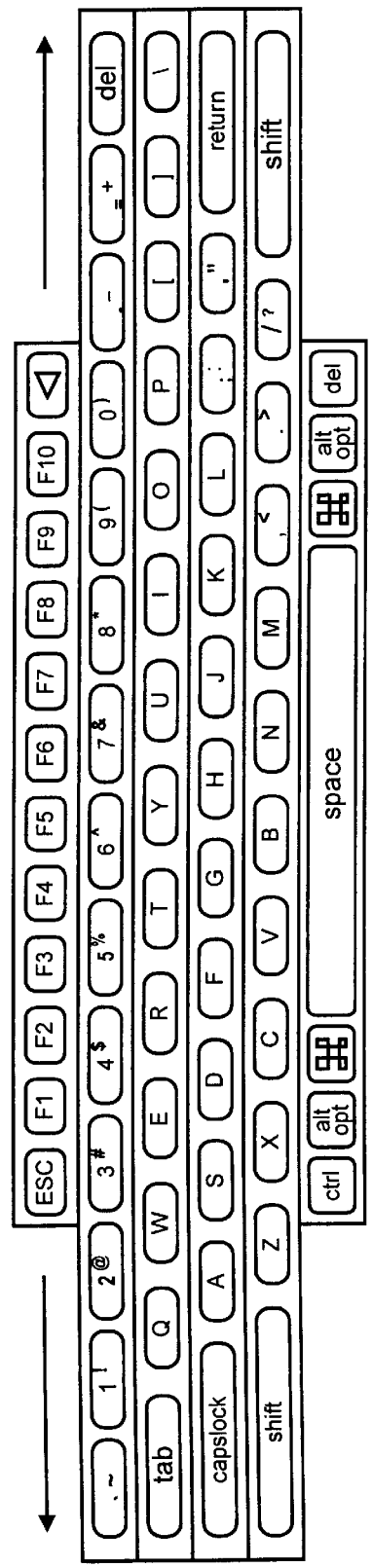
FIG. 51 shows the keyboard of FIG. 50 in the expanded state.
Figure 52:
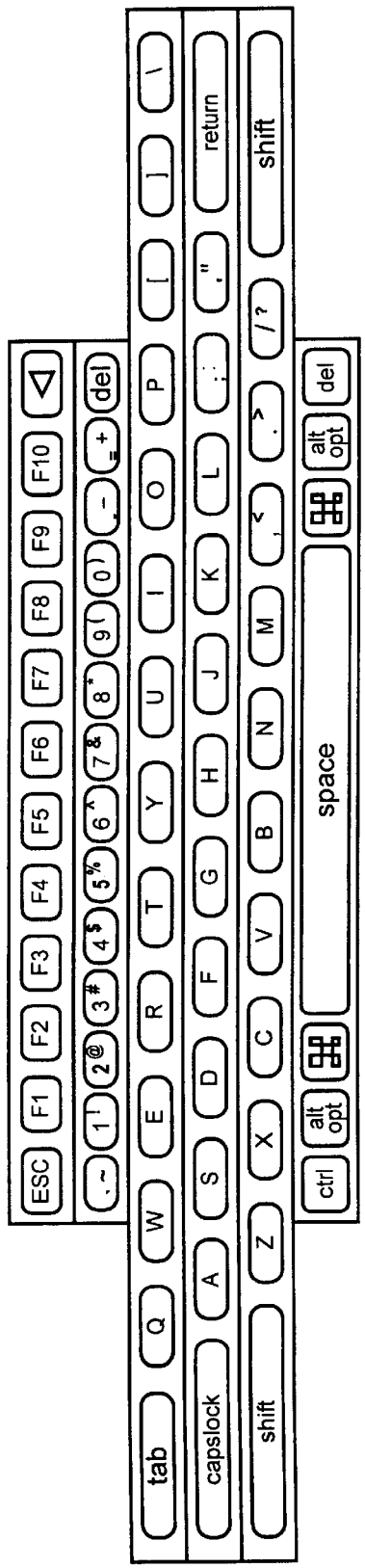
FIG. 52 shows an expandable keyboard with a three-row expandable section.

FIGS. 50 and 51 show a further embodiment of the present invention. In this aspect of the invention, a keyboard 372 with six rows is provided. The top row of keys 374 and the bottom row of keys 376 both have fixed pitch. The middle four rows of keys 378 can be expanded from a compressed position to an expanded position. Of course, any desired combination of fixed pitch and variable pitch rows can be used. For example, FIG. 52 shows a keyboard with three rows of variable pitch.

Figure 53:
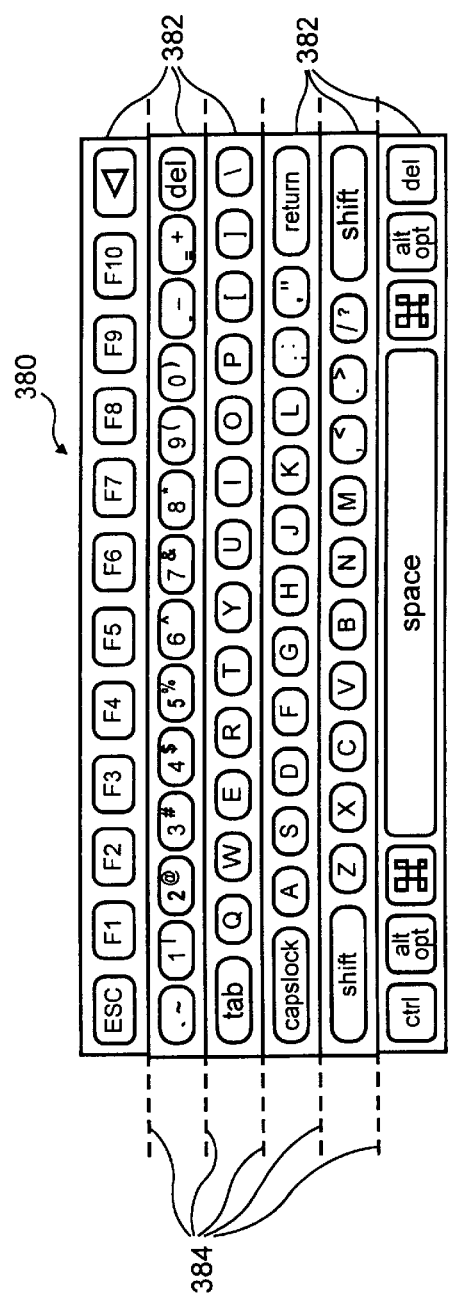
FIG. 53 shows a foldable expandable keyboard.

FIGS. 53 and 54 show a further variation of the expandable keyboard. In this variation of the invention, a keyboard with six rows 380 is provided. A fold line 384 is placed between each adjacent row of keys 382. The fold lines allow the keyboard to be rolled into a smaller shape for storage. In the illustrated embodiment, the row of keys at the top and the row of keys at the bottom of the keyboard are of fixed pitch, while the remaining rows of keys are of variable pitch. The exterior side 386 of the rolled keyboard 380 is shaped like a common cellular telephone so that it can be conveniently carried. Of course, any desired variation of fixed and variable pitch rows can be used, as well as any desired shape.

FIGS. 55 and 56 show elastic stretch belts 388 for use with the present invention. The elastic stretch belts 388 are made of any suitable material, as previously described. Additionally, the elastic stretch belts 388 have stretchable bars 390 formed on the bottom. These stretchable bars 390 may be used to enhance or alter the inherent stretch characteristics of the stretchable belt. Furthermore, they may be used to support the elastic stretch belt 388 to keep the stretch belt from sagging against a support plate 389. FIG. 57 shows the details of the mounting of a keyswitch 396 to an elastic belt 392 with stretchable bars 394. Membrane switches 400 are affixed to the underside of the elastic belt 392. Keytop buttons 402, which may be of any design described herein, are affixed to the topside of the elastic belt 392. A flexible circuit tape 404 is provided to connect the keyswitches 396 together. A support pan 406 underlies the elastic stretch belt/key assembly to support the keys when one is pressed and to prevent the elastic belt 392 from sagging.

Although the keyboard of the present invention has been described as suitable for use in an expanded position and a contracted position, it also may be used in an intermediate position. It is also possible to specifically design the keyboard as a keyboard with a fully compressed position (FIG. 58), an intermediate position (FIG. 59), and a fully expanded position (FIG. 60). The keyboard may be used in any of the three positions. The fully compressed position is suitable for use with a stylus, the intermediate position is suitable for single-finger typing, and the fully expanded position is suitable for touch typing. It is helpful in this context to provide a very light elastic belt 408 at the base of the keyswitches 410, as shown in FIG. 61. The main elastic belt 412 which supports the keyswitches 410 can then be bonded to the light elastic belt 408 intermediate the keyswitches 410. This helps maintain the keyswitches 410 in a vertical position. The bonding may be accomplished with glue, stitching, or any other suitable method.

Figure 67:
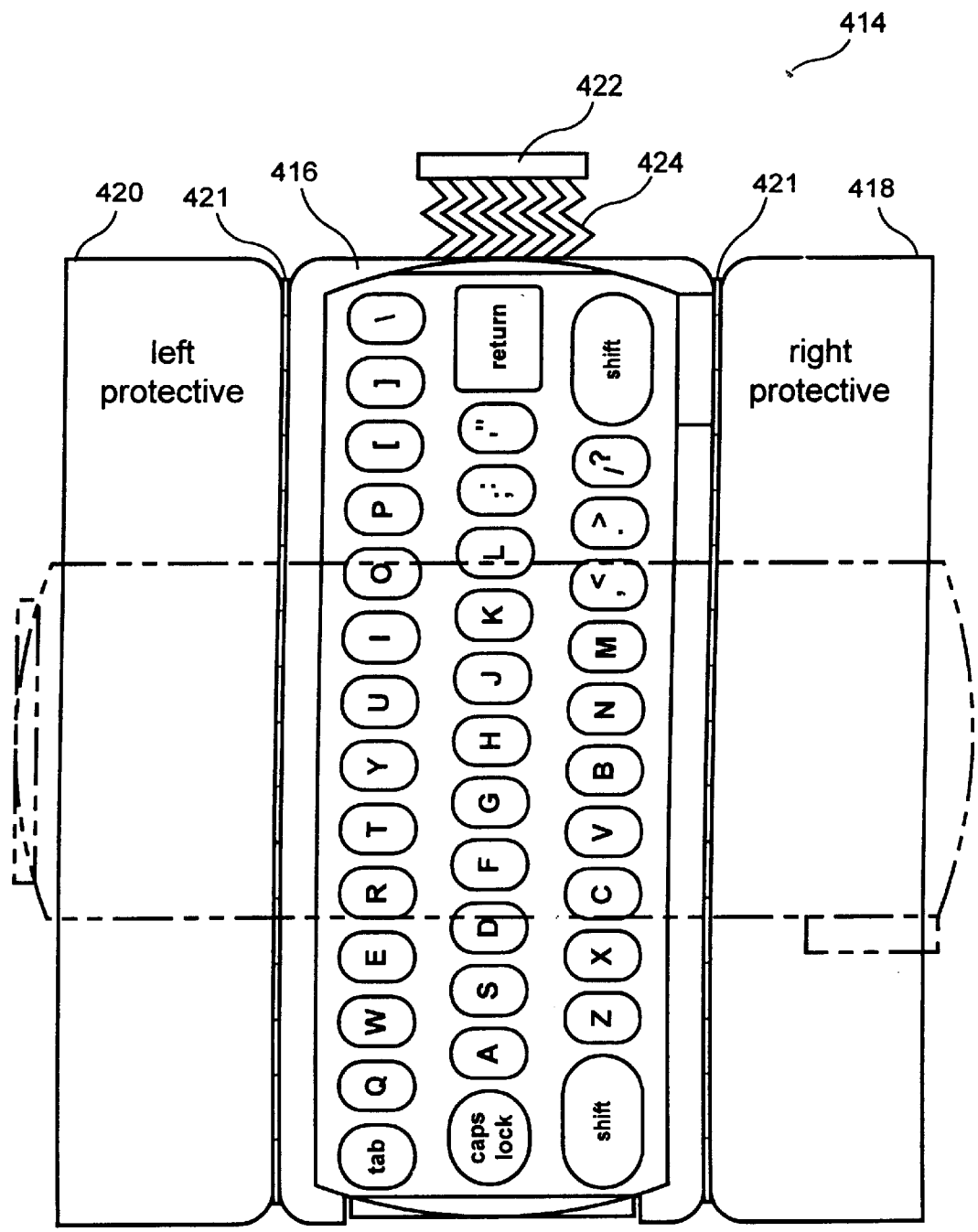

FIGS. 66–71 show an embodiment of a separate expandable keyboard which utilizes the principles of the present invention. FIG. 67 shows the keyboard 414 in a open state. As seen in that drawing, the keyboard 414 has a housing 416 with a right protective cover 418 and a left protective cover 420. The covers are attached to the keyboard with hinges 421 or any other suitable connectors. Because the keyboard 414 is a stand-alone separate keyboard, the keyboard 414 includes a connector 422 with a cable 424 to connect the keyboard 414 to a desired electronic device. Although not shown, the keyboard contains the necessary logic chip and circuitry to signal to an attached device when a key has been pressed, as known to those skilled in the art.

The particular keyboard illustrated here has two portions, a fixed portion 426 and a rotatable, expandable portion 428. In the illustrated embodiment, the three central rows 430 of the keyboard 414 are located on the rotatable, expandable portion 428. The space key and function keys are located on a lower area 425 of the fixed keyboard portion 426. The numeric keys, as well as the escape and delete keys, are located on an upper area 427 of the fixed keyboard portion 426. Other possible configurations are possible, depending on the user's desired keyboard size and intended use.

The fixed portion 426 of the keyboard 414 utilizes standard keyboard technology, such as membrane switches or mechanical keyswitches, as known in the art. The expandable portion 428 of the keyboard 414 uses the expansion principles discussed earlier, or any other suitable expansion mechanism. The expandable portion 428 of the keyboard 414 is rotatable, so that the keyboard 414 may be rotated from the "carry" position shown in FIG. 67 to the "use"

position shown in FIG. 71. The expandable keyboard 428 may be expanded from a compressed position to an expanded position. The keyboard is functional in all three positions, so that a user may enter data in the "carry" position, the compacted "use" position, or the expanded "use" position. In the illustrated embodiment, the keytops 432 are of variable size, so that upon expansion of the expandable portion of the keyboard from a compacted to an expanded position, the keytops grow in size. It is also possible to use keytops of fixed size.

Two legs 434 are provided at the ends of the expandable portion 428 of the keyboard 414. These legs 434 have a depth equal to the depth of the keyboard 414. Recesses 436 are provided in the keyboard housing 416 to receive these legs. In this manner, when the rotatable, expandable portion 428 of the keyboard 414 is rotated from the carry position to the use position, the legs 434 extend from the ends 435 of the expandable portion of the keyboard. This helps prevent the keyboard from wobbling if the keyboard is placed on a flat surface. Furthermore, the legs 434 help assure that the expandable portion 428 of the keyboard 414 is properly positioned when it is rotated to the closed position.

Figure 69:
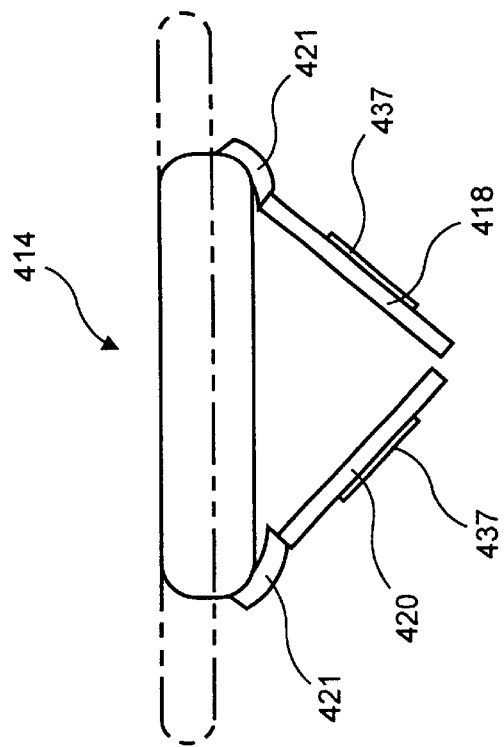
Figure 68:
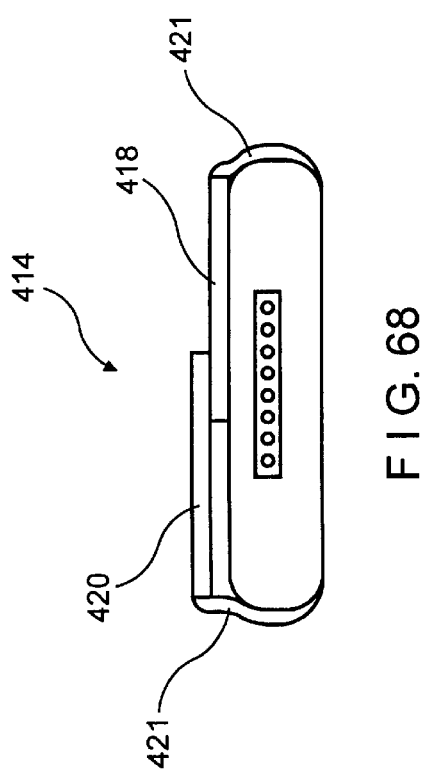
Figure 70:
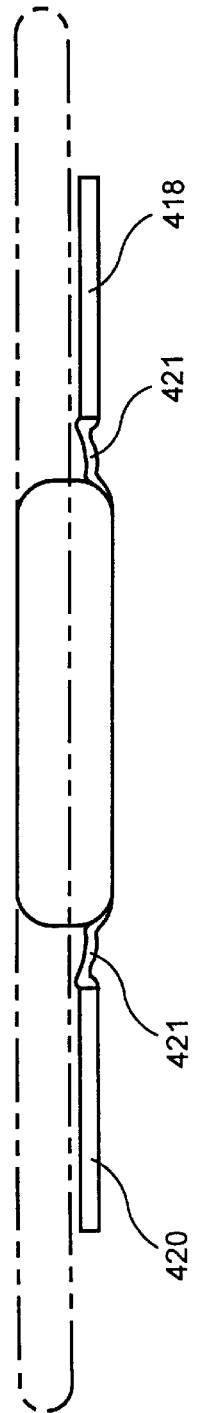

The protective covers 418, 420 of the keyboard 414 may be designed to open into an intermediate position, as shown in FIG. 69. In this position, the protective covers 418, 420 can function as a handle that a user may grip. In this context, it is preferable if the covers 418, 420 are provided with a textured surface 437 to assist gripping. Furthermore, the protective covers 418, 420 can open into a fully open position in which they lie flat, as shown in FIG. 70.

Figure 62:
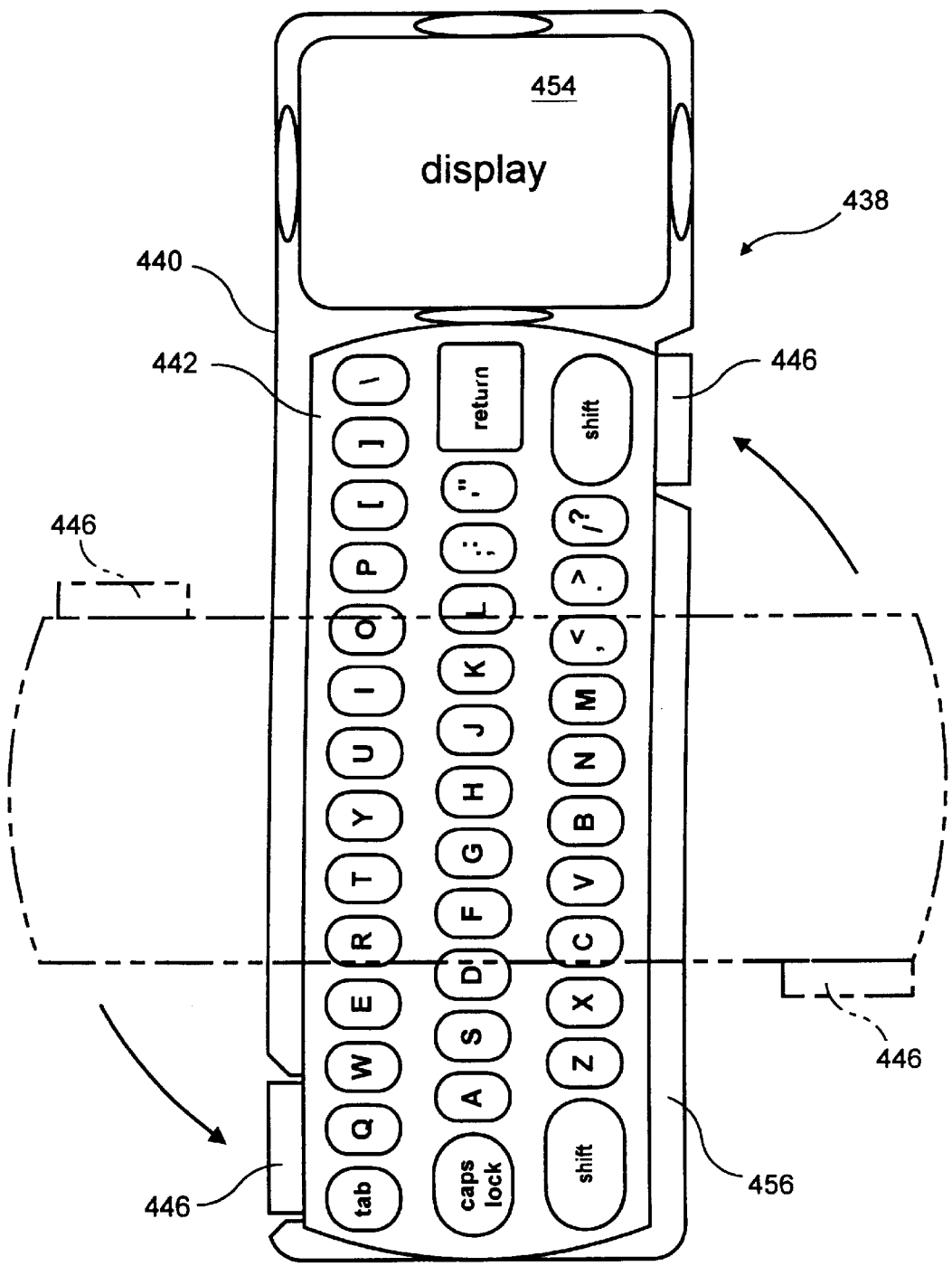
FIG. 62 shows a cellular phone which incorporates an expandable keyboard.
Figure 63:
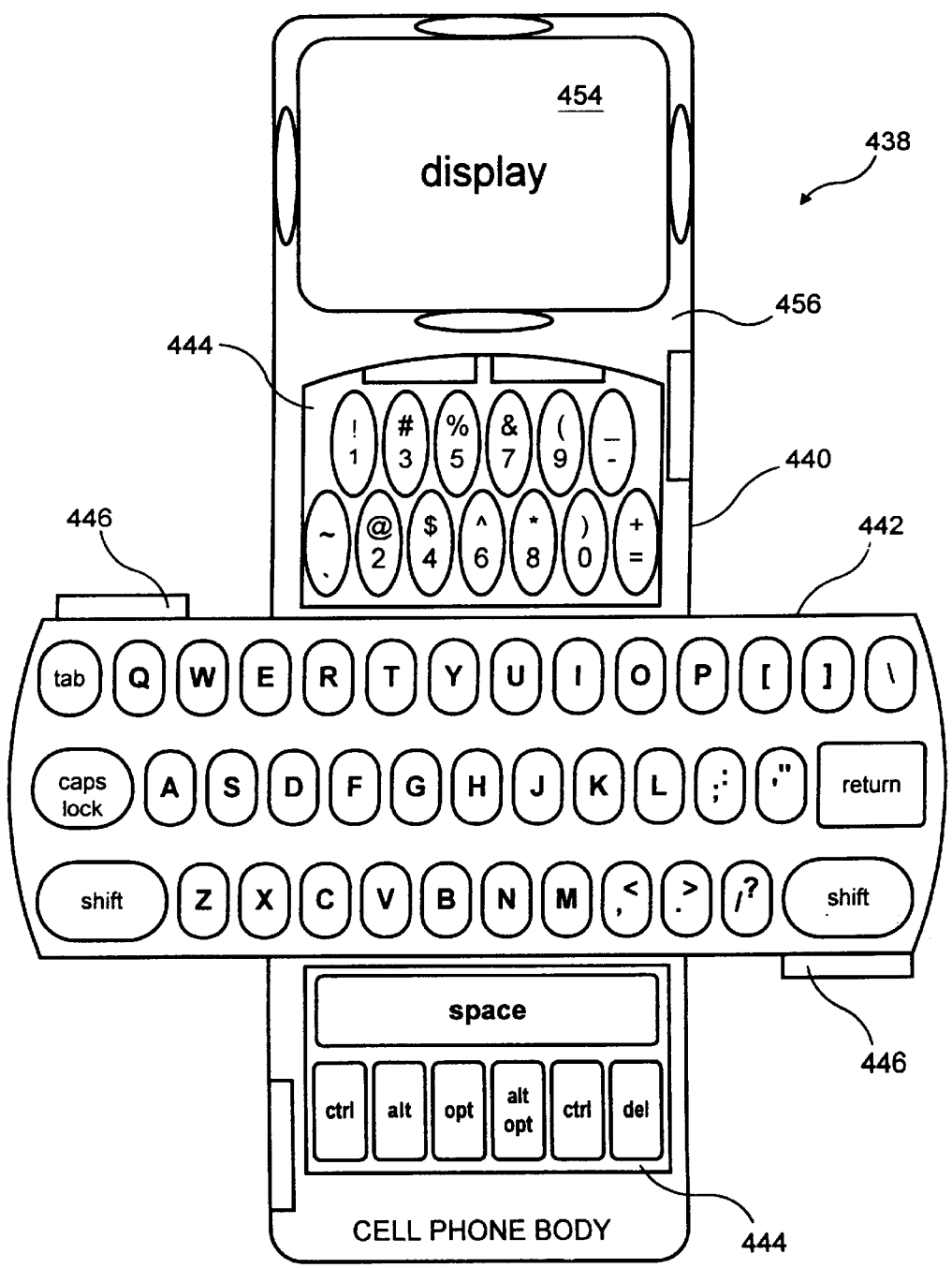
FIG. 63 shows a cellular phone which incorporates an expandable keyboard.
Figure 64:
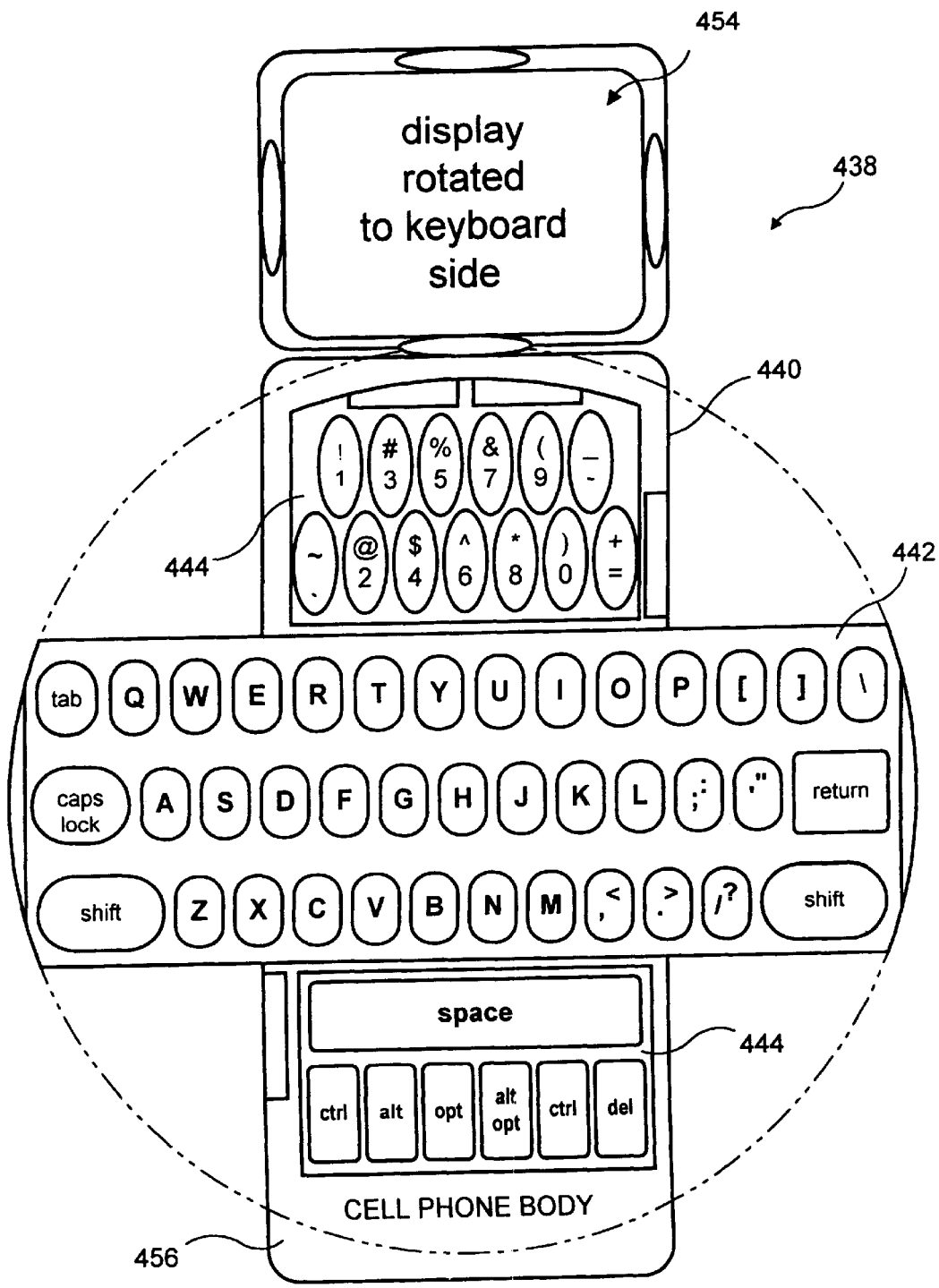
FIGS. 64 and 65 show a cellular phone which incorporates an expandable keyboard.
Figure 65:
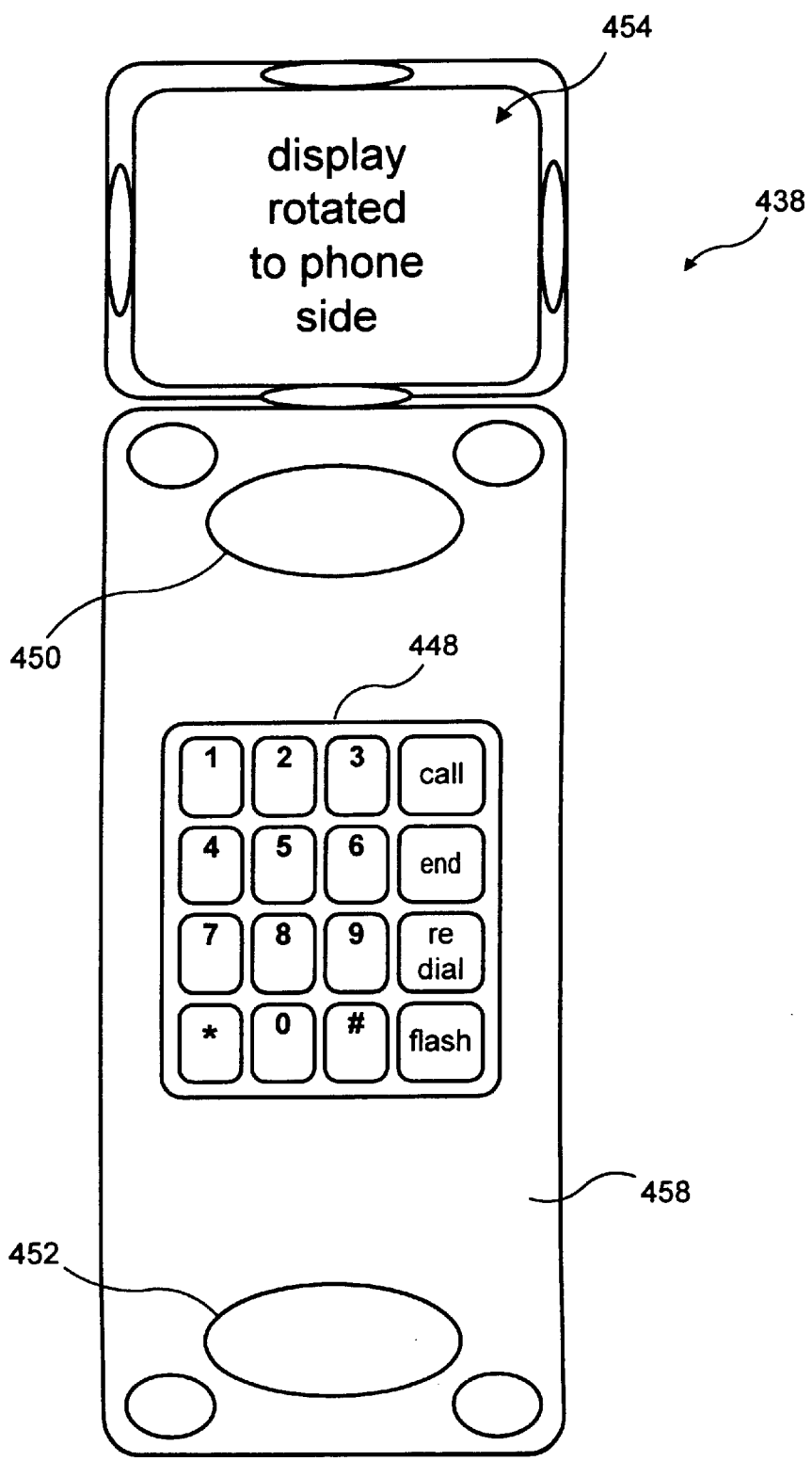
Figure 66:
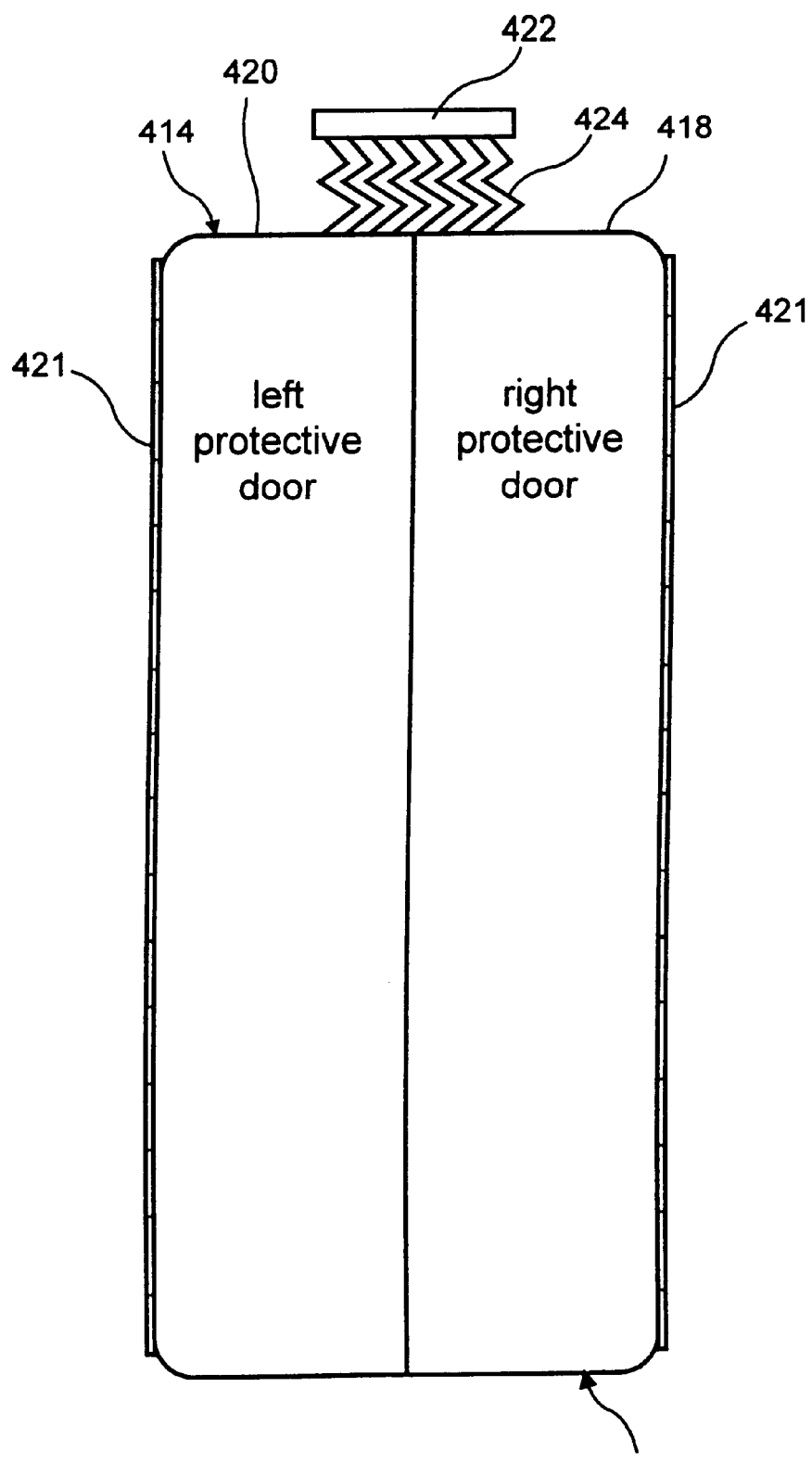

FIGS. 62–65 show an embodiment of the keyboard which is integrated into a cellular phone 438. The keyboard portion 440 of this design is similar to the separate stand-alone keyboard just described, with a rotatable expandable portion 442 and a fixed portion 444. Furthermore, the rotatable expandable portion 442 has legs 446 to support the keyboard 440, as discussed in conjunction with the separate keyboard. As seen in FIG. 62, the front side 456 of the phone 438 has an expandable, rotatable keyboard portion 442 arranged together with a fixed keyboard portion 444. The back side 458 of the phone 438 has a standard phone assembly, i.e. a numeric keypad 448, a speaker 450, a microphone 452, and a display 454. In the illustrated embodiment, the display is rotatable so that it may be viewed from either the front side 456 or back side 458 of the phone 438. Although in the preferred embodiment the display is rotatable, it is also possible to design the display as a hinged, slidable, flipover, or other otherwise multi-positionable. The display 454 may also be immobile.

Figure 72:
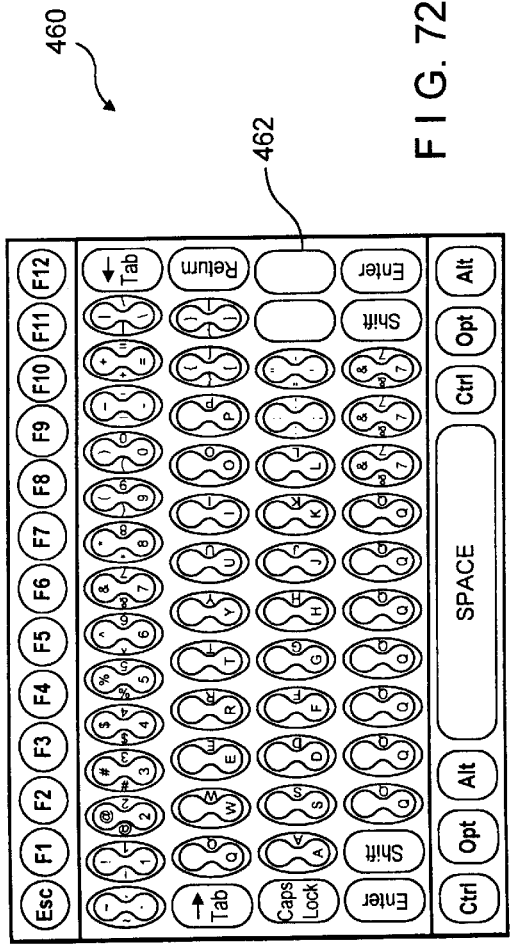
Figure 73:
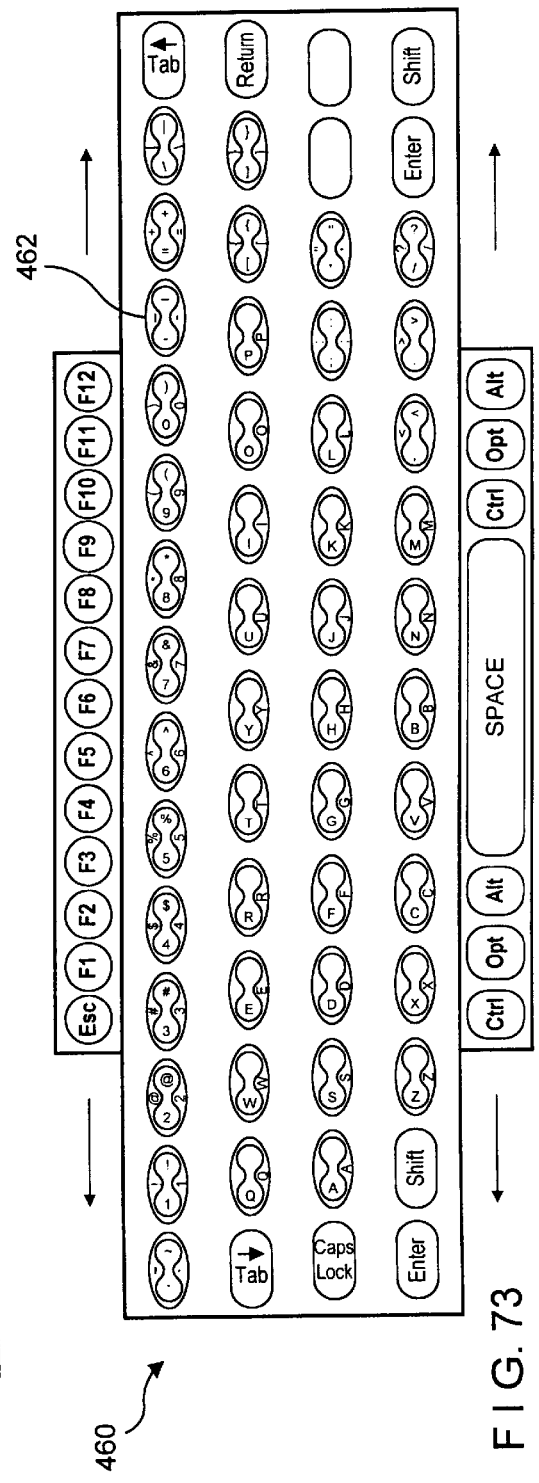

FIGS. 72–75 shows an alternative embodiment of the keyboard 460 with rotatable keytops 462. In this embodiment of the keyboard 460, the keytops 462 are rotated 90° to provide a narrow key top in the compressed position and wider keytops in the expanded position. As shown in FIG. 72, when the keyboard is its compressed position, the keytops are oriented vertically. When the keyboard is placed in the expanded position shown in FIG. 73, the keytops rotate 90° to a horizontal position. To accomplish this, the keytops 462 are rotatable around a center post 464. The center post 464 may take the form of an operator barrel of a keyswitch (which was described earlier). Alternatively, a separate center post 464 may be provided. An elastic cord 466 is sewn between the top 468 of the keytop and the left center 470 of the stretchable fabric 472 of the keyboard. A non-stretchable thread 474 connects the top 468 of the keybutton and the right center 478 of the elastic belt at the right adjacent button area.

In operation, when the elastic belt 472 is in the compressed position, the elastic cord 466 pulls the keytop 462 into the vertical position. When the keyboard is placed in the expanded position, the non-stretchable thread 474 pulls the keytop 462, rotating the keytop 462 about the center post 464 to a horizontal position. It is preferable if the keytops have dual indicia. The first indicia would be legible when the keytop is vertical, and the second indicia would be legible when the keytop is horizontal.

What is claimed is:

1. An expandable keyboard comprising:
   a keyboard housing which is extendible substantially in a single plane from a contracted position to an expanded position;
   at least one elastic belt, the elastic belt attached to the housing; and
   a plurality of keyswitch assemblies, each keyswitch assembly attached to the elastic belt so that when the keyboard housing is extended from a compressed position to an expanded position the key pitch is increased,
   a plurality of keytops associated with the plurality of keyswitch assemblies, the keytops being rotatable about an axis substantially perpendicular to the plane between a first position and a second position substantially perpendicular to the first position.

2. A keyboard according to claim 1, further comprising:
   a plurality of elastic cords associated with the plurality of keytops for biasing the keytops into one of the first position and the second position.

3. A keyboard according to claim 1, further comprising:
   a plurality of non-stretchable cords associated with the plurality of keytops for urging the keytops into one of the first position and the second position when the keyboard is extended from the contracted position to the expanded position.

4. The keyboard according to claim 1, wherein the housing includes components movable relative to one another to extend the housing substantially in the single plane between the contracted position and the expanded position, the components of the housing substantially rigid as compared to the elastic belt.

5. The keyboard according to claim 1, wherein the keyboard housing is extendible without folding.

* * * * *